United States Patent
Choi et al.

(10) Patent No.: US 6,831,711 B2
(45) Date of Patent: Dec. 14, 2004

(54) LIQUID CRYSTAL DISPLAY DEVICE INCLUDING A TRANSFLECTOR AND A BACKLIGHT BETWEEN TWO LIQUID CRYSTAL DISPLAY PANELS

(75) Inventors: Jung-Min Choi, Suwon-si (KR); Dong-Ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/454,700

(22) Filed: Jun. 3, 2003

(65) Prior Publication Data

US 2004/0017529 A1 Jan. 29, 2004

(30) Foreign Application Priority Data

Jul. 26, 2002 (KR) ............................ 10-2002-0044264

(51) Int. Cl.$^7$ .................... G02F 1/1347; G02F 1/1335
(52) U.S. Cl. ...................... 349/74; 349/61; 349/62; 349/114
(58) Field of Search ................... 349/61, 62, 65, 349/73, 74, 113, 114

(56) References Cited

U.S. PATENT DOCUMENTS

| | | | |
|---|---|---|---|
| 4,637,687 A | * 1/1987 | Haim et al. | 349/81 |
| 4,693,560 A | * 9/1987 | Wiley | 349/114 |
| 5,103,328 A | * 4/1992 | Numao | 349/74 |
| 5,537,233 A | 7/1996 | Miura et al. | 359/48 |
| 6,141,068 A | 10/2000 | Iijima | 349/96 |
| 6,707,515 B1 | * 3/2004 | Ide et al. | 349/74 |

FOREIGN PATENT DOCUMENTS

| | | |
|---|---|---|
| DE | 37 40 647 A1 | 6/1989 |
| JP | 9-43596 | 2/1997 |
| KR | 20020039273 | 5/2002 |
| WO | 97/01788 | 1/1997 |

OTHER PUBLICATIONS

PCT Notification of Transmittal of the International Search Report of the Declaration; International application No. PCT/KR03/01045; International filing date of May 28, 2003; Mailing date of Sep. 25, 2003.

* cited by examiner

*Primary Examiner*—Tarifur R. Chowdhury
(74) *Attorney, Agent, or Firm*—Cantor Colburn LLP

(57) ABSTRACT

Disclosed is an LCD device for performing bi-directional display. The LCD device includes first and second display units, and a light supplying unit. The first display unit includes an LCD panel and a transflective film that is disposed under the LCD panel and has layers in which first and second layers having different refractivity indexes are alternately stacked. The transflective film partially reflects and transmits light incident onto the film. The light supplying unit is disposed between the first and second display units, and provide the first and second display units with light generated from a lamp by dividing the light, to thereby regulate a contrast ratio of a luminance between the first and second display units. Therefore, the structure of an LCD panel for performing bi-directional image display can be simplified, and the light loss in the transmission mode can be reduced.

33 Claims, 20 Drawing Sheets

FIG.12
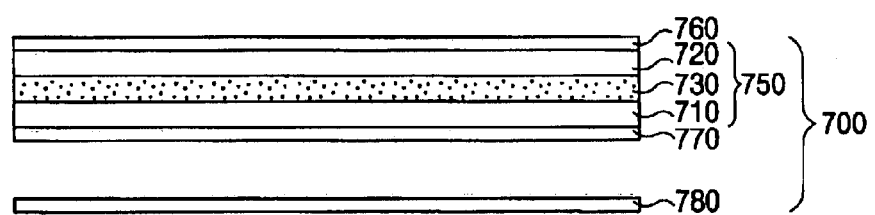
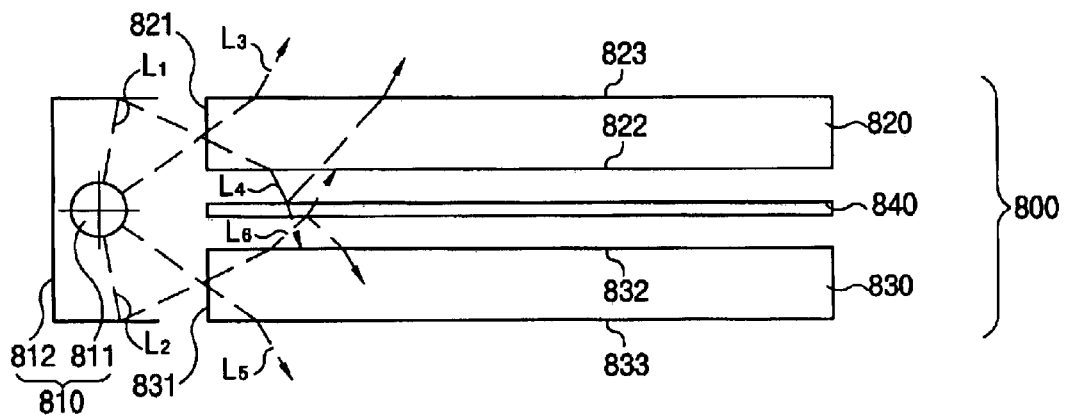
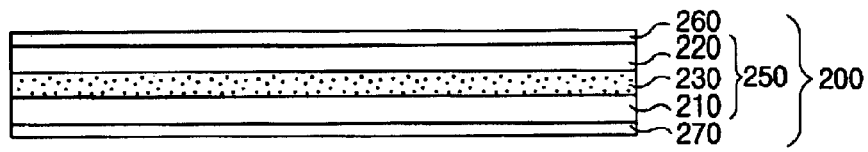

LIQUID CRYSTAL DISPLAY DEVICE INCLUDING A TRANSFLECTOR AND A BACKLIGHT BETWEEN TWO LIQUID CRYSTAL DISPLAY PANELS

BACKGROUND OF THE INVENTION

1. Field of the Invention

The present invention relates to a liquid crystal display (LCD) device, and more particularly to a liquid crystal display device in which a light loss of the liquid crystal display device is reduced in a transmission mode and a bi-directional display is provided.

2. Description of the Related Art

In these days, electronic display devices become more important for communicating and processing various information. Also, various types of electronic display devices are widely used in different industrial fields.

Generally, an electronic display device visually provides a variety of information to a user. In other words, an electrical information signal output from electronic devices is converted into a visible optical information signal in an electronic display device. Such an electronic display device serves as an interfacing means between a user and the electronic devices.

Meanwhile, owing to developments in the semiconductor technology, recent electronic devices are generally driven by lower voltage and lower power, and have a slimmer size and a lighter weight. With such a trend, a flat panel type display device which is slimmer and lighter and requires lower driving voltage and power becomes in more demand and desirable.

An LCD device among the various types of flat panel display devices is much slimmer and lighter than any other display devices, and has a lower driving voltage and lower power consumption, and also has the displaying quality similar to that of CRT-type display devices. Therefore, LCD devices are widely used in various electronic equipments.

Recently, an LCD device for performing a bi-directional image display has been developed.

Specifically, a conventional LCD device for performing the bi-directional image display includes a backlight, a first LCD panel and a second LCD panel. The first LCD panel is disposed above (or below) the backlight, and the second LCD panel is disposed below (or above) the backlight.

In the conventional LCD device for performing the bi-directional image display, light radiated from a lamp(s) is divided into two groups of light. A first group of light is provided to the first LCD panel, and a second group of light is provided to the second LCD panel. The conventional LCD device only has the function of dividing the light radiated from the lamp(s), but does not have the function of regulating an amount of each of the two groups. It is thus desired that an LCD device can divide the light radiated from the lamp(s) into two groups and also can regulate the amount of each of the two groups.

An LCD panel, which is available for the LCD device capable of performing the bi-directional image display, may have a structure in which the LCD panel can display images in a transmission mode or a reflection mode according to an amount of external light. The LCD panel includes a first substrate, a second substrate, a liquid crystal layer interposed between the first and second substrates, and pixel electrodes. The pixel electrodes are formed on the first substrate, and each of the pixel electrodes has a transparent electrode region and a reflective electrode region. Light is transmitted through the transparent electrode region in the transmission mode, and is reflected by the reflective electrode region in the reflection mode. Accordingly, the LCD panel displays images by means of the transparent electrode region in the transmission mode, and displays images by means of the reflective electrode region in the reflection mode.

The conventional LCD device having the above structure has at least the following problems.

First, since a display area of the LCD device is divided into a transmission area used in the transmission mode and a reflection area used in the reflection mode, it is not effective in aspect of utilization of the display area.

Second, since the conventional LCD device has to employ the wide band ¼ wavelength phase difference plates covering an overall frequency band of the visible ray, as well as a first and a second polarizing plates attached on each of the first and second substrates, a manufacturing cost is elevated compared with a transmission type LCD device that displays images by means of a backlight disposed under the LCD panel.

Third, since the polarization characteristic in the transmission mode causes a light loss of 50%, there are drawbacks in that a light transmissivity decreases by 50% and a contrast ratio (C/R) is lowered.

Fourth, since $\Delta nd$ ($\Delta n$: a value for representing optical anisotropy or refractive anisotropy; d: cell gap) of a liquid crystal layer is only 0.24 $\mu m$ which is a half of $\Delta nd$ (0.48 $\mu m$) of the conventional transmission type LCD device, the cell gap of the liquid crystal cell should be decreased to a level of 3 $\mu m$, and the $\Delta n$ of the liquid crystal also should be decreased. Accordingly, there are problems in that the manufacturing process becomes difficult and degeneration in the reliability of the liquid crystal is caused.

SUMMARY OF THE INVENTION

Accordingly, the present invention is to solve the aforementioned and other problems of the conventional art, and it is an object of the present invention to provide an LCD device capable of simplifying a structure of an LCD panel, decreasing light loss in the transmission mode and performing a bi-directional image display.

In one aspect, there is provided a liquid crystal display device comprising: a first display unit including a first liquid crystal display panel having a first substrate, a second substrate and a first liquid crystal layer between the first and second substrates, and a transflective film disposed under the first liquid crystal display panel, the transflective film having a plurality of layers in which a first layer and a second layer having different refractivity indexes from each other are alternately stacked, so that the transflective film partially reflects and partially transmits incident light incident onto the transflective film; a second display unit including a second liquid crystal display panel having a third substrate, a fourth substrate and a second liquid crystal layer between the third and fourth substrates; and a light supplying unit disposed between the first and second display units, the light supplying unit generating a first light to provide the first display unit with a first part of the first light and the second display unit with a second part of the first light, and the light supplying unit controlling an amount of the first and second parts of the first light to regulate a contrast ratio of a luminance between the first and second display units.

According to another aspect of the invention, there is provided a liquid crystal display device comprising: a first display unit including a first liquid crystal display panel having a first substrate, a second substrate and a first liquid crystal layer disposed between the first and second substrates, and a first transflective film disposed under the first liquid crystal display panel, the first transflective film having a plurality of layers in which a first layer and a second layer having different refractivity indexes from each other are alternately stacked, so that the first transflective film partially reflects and partially transmits a first incident light incident onto the first transflective film; a second display unit including a second liquid crystal display panel having a third substrate, a fourth substrate and a second liquid crystal layer disposed between the third and fourth substrates; and a light supplying unit disposed between the first and second display units, the light supplying unit dividing a first light, which is a first part of a light generated from an light source, into a third light and a fourth light to provide the first and second display units with the third and fourth light, respectively, and dividing a second light, which is a second part of the light generated from the light source, into a fifth light and a sixth light to provide the first and second display units with the fifth and sixth light, respectively, the light supplying unit controlling an amount of the third, fourth, fifth and sixth light to regulate a contrast ratio of a luminance between the first and second display units.

In an exemplary embodiment, the LCD device includes a first transflective film disposed at one of the first and second display units. The first transflective film has a plurality of layers in which a first layer and a second layer having different refractivity indexes from each other are alternately stacked, so that the first transflective film partially reflects and partially transmits a first incident light incident on the first transflective film. The LCD device includes a light supplying unit disposed between the first and second display units. The light supplying unit controls an amount of the light that is provided to the first and second display units, to thereby regulate a contrast ratio of a luminance between the first and second display units. Therefore, the structure of an LCD panel for performing a bi-directional image display can be simplified, and the light loss in the transmission mode can be reduced.

In another exemplary embodiment, the LCD device includes an anisotropy transflective film or an isotropy transflective film disposed at one of the first and second display units. The anisotropy transflective film has an optical characteristic in which light components in a specific direction are strongly reflected and polarization components in a direction perpendicular to the specific direction are partially transmitted and reflected depending on polarized state and direction of the incident light incident thereto. The isotropy transflective film has an optical characteristic in which light components are partially transmitted and reflected independent of polarized state and direction of the incident light. As a result, by a light restoring process occurring between the transflective film and the backlight, the restored light is transmitted through the transflective film repeatedly, so that transmissivity and light efficiency can be enhanced.

Further, the LCD device has no reflection electrode within liquid crystal (LC) cell and has no ¼-wavelength phase difference plate on each of the first substrate and the second substrate. Accordingly, compared with a conventional LCD device, the LCD device of the present invention can be made in more simple structure, and degeneration in the reliability of the liquid crystal can be prevented.

Furthermore, since the light supplying unit disposed between the first and second display units regulates the luminance of the light generated from the lamp to provide the first and second display units with the light of which luminance is regulated, the LCD device of the present invention satisfies the demand from users.

BRIEF DESCRIPTION OF THE DRAWINGS

The above and other objects and advantages of the present invention will become more apparent by describing in detail exemplary embodiments thereof with reference to the attached drawings in which:

FIG. 12 is a sectional view showing a liquid crystal display device according to another exemplary embodiment of the present invention;

DETAILED DESCRIPTION OF THE INVENTION

Now, exemplary embodiments of the present invention will be described in detail with reference to the annexed drawings.

Figure 1:
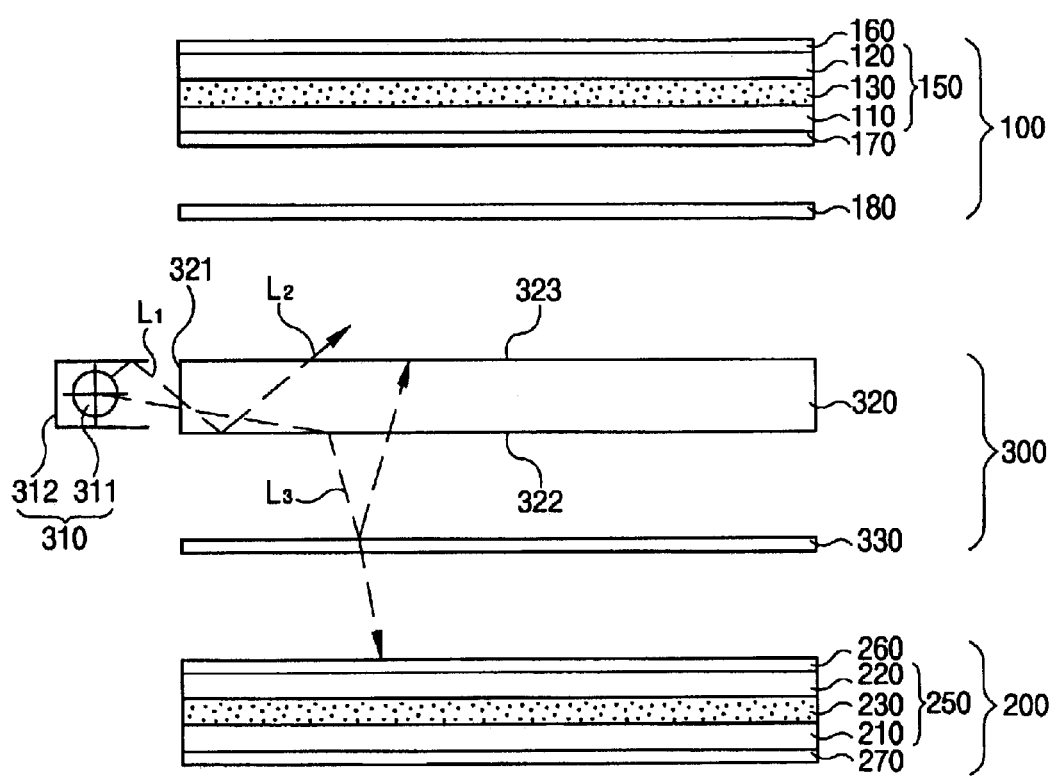
FIG. 1 is a sectional view showing a liquid crystal display device according to an exemplary embodiment of the present invention.
Figure 2:
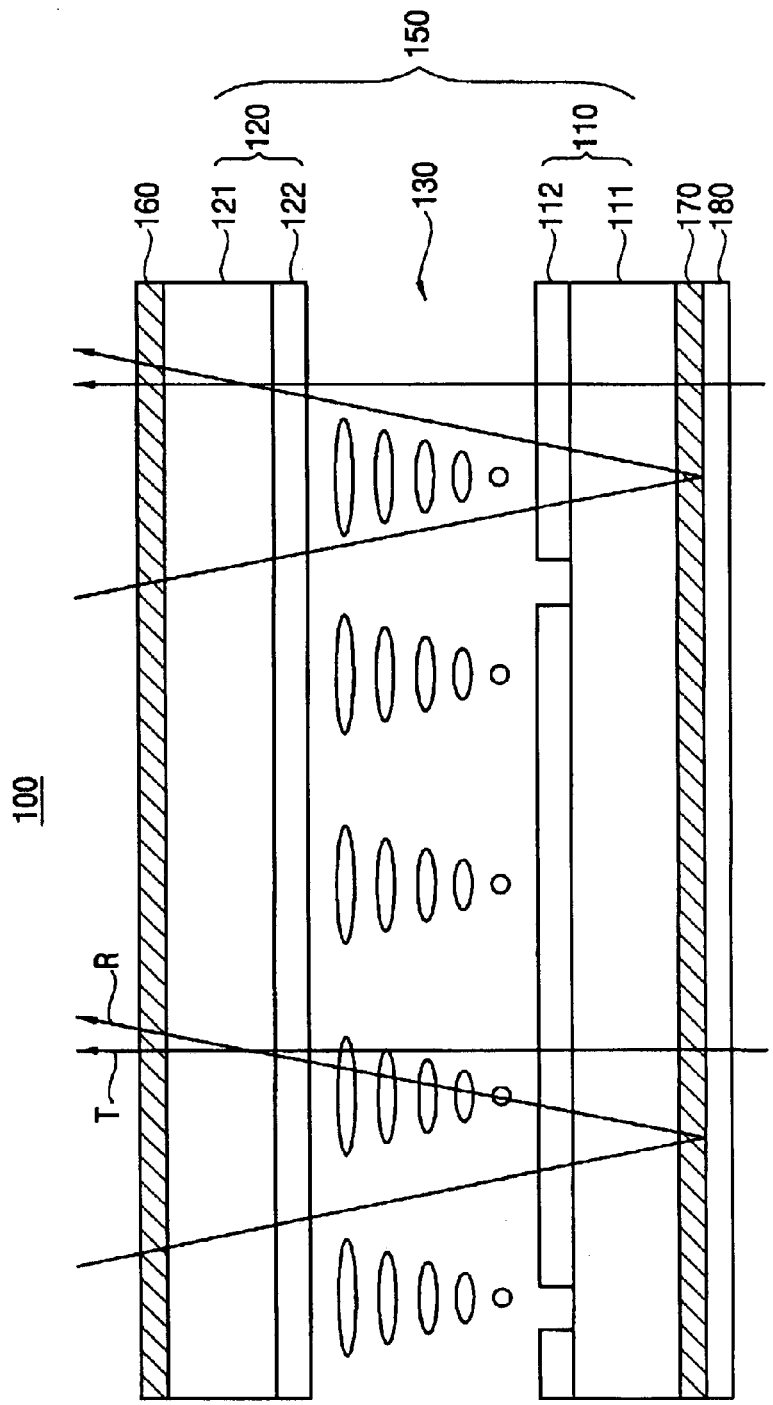
FIG. 2 is a sectional view showing a first display unit of FIG. 1.

FIG. 1 is a sectional view showing a liquid crystal display device according to an exemplary embodiment of the present invention, and FIG. 2 is a sectional view showing a first display unit of FIG. 1.

Referring to FIG. 1, an LCD device includes a first display unit 100 for displaying first images, a second display unit 200 for displaying second images, and a light supplying unit (Hereinafter, refer to a backlight) 300 disposed between the first and the second display units 100, 200.

The first display unit 100 includes a first LCD panel 150, a first polarizing plate 160, a second polarizing plate 170 and a transflective film 180. The first LCD panel 150 includes a first substrate 110, a second substrate 120 of which an lower surface is arranged facing the first substrate 110, and a first liquid crystal layer 130 disposed between the first substrate 110 and the second substrate 120.

As shown in FIG. 2, on a first insulating substrate 111 is formed a first transparent electrode 112 made of, for example, conductive oxide film such as indium tin oxide (ITO), to thereby constitute the first substrate 110. On a second insulating substrate 121 is formed a second transparent electrode 122 made of, for example, conductive oxide film such as ITO, to thereby constitute the second substrate 120. The first transparent electrode 112 of the first substrate 110 is arranged facing the second transparent electrode 122 of the second substrate 120.

The first liquid crystal layer 130 is made of, for example, 90° twisted TN (Twisted Nematic) liquid crystal composition. According to the present embodiment, the first liquid crystal layer 130 has "Δnd" of about 0.2–0.6 μm, that is a product of a refractive anisotropy (Δn) and a thickness (d) of the first liquid crystal layer 130, preferably about 0.48 μm. In the LCD device of the present embodiment, the liquid crystal optical conditions of a conventional transmission-type LCD device may be adopted without a variation, thereby preventing the reliability of the liquid crystal from being affected.

On an upper surface of the first LCD panel 150 is disposed a first polarizing plate 160, and a second polarizing plate 170 is formed on a lower surface of the first LCD panel 150. The first and second polarizing plates 160 and 170 absorb a predetermined polarization component and transmit other polarization components, thereby allowing incident light to be transmitted in a specific direction. The first and second polarizing plates 160 and 170 are linear polarizers of which polarizing axes are arranged to be perpendicular to each other.

Figure 3:
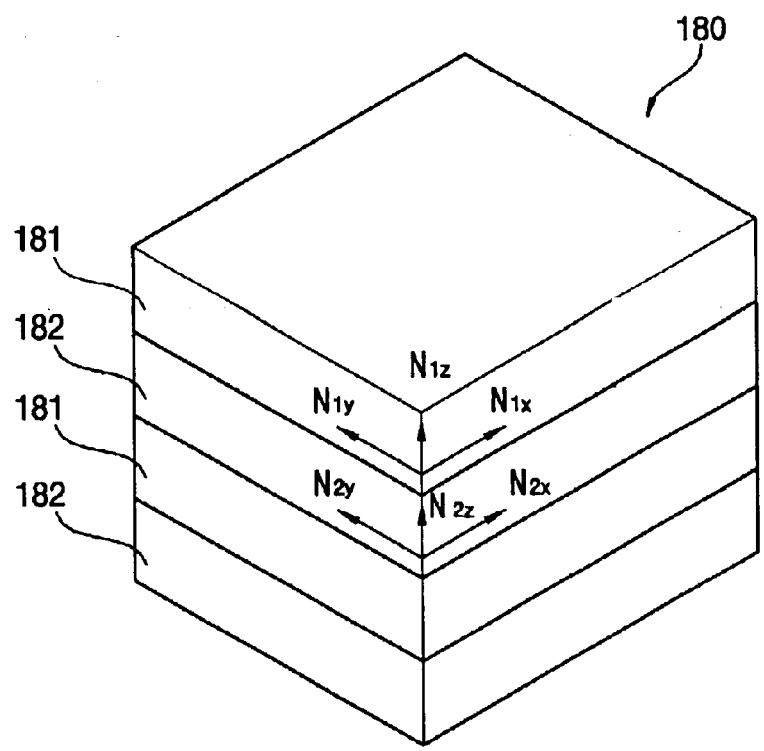
FIG. 3 is a schematic view showing a structure of a transflective film of FIG. 1.

Under the second polarizing plate 170 is disposed a transflective film 180 including at least two transparent layers having different refractivity index values from each other, i.e., a first layer 181 and a second layer 182 alternately stacked as shown in FIG. 3. The transflective film 180 partially reflects and partially transmits the incident light incident thereto. Accordingly, the LCD device in accordance with the present embodiment has a reflection light path (R) and a transmission light path (T). In the reflection light path (R), the incident light is incident toward the second substrate 120, transmits through the first substrate 110, is reflected by the transflective film 180, and exits through the second substrate 120. In the transmission light path (T), the incident light is incident from the backlight 300 onto the first substrate 110, is transmitted through the transflective film 180, and exits through the second substrate 120.

Referring again to FIG. 1, the second display unit 200 includes a second LCD panel 250, a third polarizing plate 260, a fourth polarizing plate 270. The second LCD panel 250 includes a third substrate 210, a fourth substrate 220 of which an lower surface is arranged facing the third substrate 210, and a second liquid crystal layer 230 disposed between the third substrate 210 and the fourth substrate 220.

On an upper surface of the second LCD panel 250 is disposed a third polarizing plate 260, and a fourth polarizing plate 270 is formed on a lower surface of the second LCD panel 250. The third and fourth polarizing plates 260 and 270 absorb a predetermined polarization component and transmit other polarization components, thereby allowing incident light to be transmitted in a specific direction. The third and fourth polarizing plates 260 and 270 are linear polarizers of which polarizing axes are arranged to be perpendicular to each other.

The backlight 300 is installed between the first and the second display units 100, 200. The backlight 300 generates light and provides the first and second display units 100, 200 with a part of the generated light.

As shown in FIG. 1, the backlight 300 includes a light guiding member 320 and a luminance controlling member 330. The light guiding member 320 guides the light generated form a lump unit 310, and the luminance controlling member 330 controls the luminance of the light that is supplied to the first and second display units 100, 200.

The light guiding member 320 has a shape of a rectangular parallelepiped plate, and includes four side faces including an incident face 321, a light reflective-transmissive face 322 and a light exiting face 323. The light exiting face 323 faces the light reflective-transmissive face 322.

The light incident face 321 receives first light L1 generated from the lamp unit 310. The lamp unit 310 includes a lamp 311, a lamp reflector 312 covering the lamp 311 to reflect the first light L1. The lamp 311, preferably, employs a linear light source such as a cold cathode fluorescent lamp (CCFL), but is not limited to the linear light source. The lamp 311 may be a point light source such as a light emitting diode (LED).

The first light L1 generated from the lamp 311 is incident into the light guiding member 320 through the light incident face 321. The light guiding member 320 divides the first light L1 to exit second and third lights L2, L3. The light guiding member 320 exits the second light L2 or a part of the first light L1 toward the first display unit 100, and exits the third light L3 or the other part of the first light L1 toward the second display unit 200. Specifically, the second light L2 includes the light exiting directly from the light exiting face 323 and the light being reflected by the light reflective-transmissive face 322. The third light L3 is the light that passes through the light reflective-transmissive face 322 to proceed toward the second display unit 200.

The light guiding member 320 is able to provide both the first and second display units 100, 200 with light. However, it is difficult for the light guiding member 320 to control the luminance of the light supplied to the first and second display units 100, 200. Accordingly, the backlight 300 further includes a luminance controlling member 330 to as to regulate the luminance between the first display unit 100 and the second display unit 200.

The luminance controlling member 330 reflects a part of the third light L3 to provide the first display unit 100 with the reflected part of the third light L3 through the light guiding member 320, and transmits the other part of the third light L3 to provide the second display unit 200 with the other part of the third light L3.

The luminance controlling member 330 may have a sheet shape or a plate shape thicker than the sheet shape, and is made of, for example, polyethylene terephthalate (PET) treated by foaming agent. The luminance controlling member 330 reflects about 80% of the third light L3 and transmits about 20% of the third light L3 according to one embodiment of the present invention. In addition, the luminance controlling member 330 reflects about 20% of the third light L3 and transmits about 80% of the third light L3 according to another embodiment of the present invention.

The material of the luminance controlling member 330 is not limited to polyethylene terephthalate (PET) treated by foaming agent. The luminance controlling member 330 may be made of any material that can partially reflect and partially transmit light.

FIG. 3 is a schematic view showing a structure of the transflective film of FIG. 1.

Referring to FIG. 3, when it is assumed that the transflective film 180 has a film thickness in direction z and a film plane in x-y plane, the transflective film 180 according to one aspect of the invention is characterized such that the first layer 181 thereof has a refractive anisotropy in its film plane, i.e., x-y plane, and the second layer 182 does not have a refractive anisotropy in its film plane. The film plane is parallel to a surface of the transflective film.

The transflective film 180 has various transmissivity and reflectivity characteristics depending on a polarized state and a direction of the incident light. For instance, when it is assumed that a direction parallel to an elongated direction of the transflective film 180 is x-direction and a direction perpendicular to the elongated direction is y-direction, the first layer 181 having a high refractivity and refractive anisotropy within the film plane and the second layer 182 not having refractive anisotropy each have three main refractive indexes, $n_x$, $n_y$ and $n_z$, that satisfy the following relationships (1):

$$n1_x = n1_z \neq n1_y;$$

$$n2_x = n2_y = n2_z;$$

$$n1_x \neq n2_x;$$

$$n1_y \neq n2_y; \text{ and}$$

$$|n1_x - n2_x| < |n1_y - n2_y| \quad (1).$$

($n1x$, $n1y$, $n1z$ denote main refractive indexes of the first layer in the x-axis, y-axis, z-axis, respectively, and $n2x$, $n2y$, $n2z$ denote main refractive indexes of the second layer in an x-axis, y-axis, z-axis, respectively)

Thus, if a refractivity difference in the x-direction between the first layer 181 and the second layer 182 is less than a refractivity difference in the y-direction between the first layer 181 and the second layer 182, when a non-polarized light is incident in the direction perpendicular to the film plane, i.e., z-direction, a polarization component polarized parallel to the y-direction is mostly reflected due to a high difference in the refractivity based on Fresnel's equation, but a polarization component polarized parallel to the x-direction partially is transmitted and reflected due to a low difference in the refractivity.

There are disclosed methods for enhancing the display brightness by using a reflection type polarizing plate made of dielectric multilayered film having birefringence in Japanese Patent Laid Open Publication No. 9-43596 and International Patent Publication No. WO 97/01788. The dielectric multilayered film having birefringence has a structure in which two kinds of polymer layers are alternately stacked. One of the two kinds of polymer layers is selected from a polymer group having a high refractivity and the other is selected from a polymer group having a low refractivity.

Hereinafter, the structure of the dielectric multilayered film is reviewed in an aspect of optical property.

For instance, when it is assumed that there is the following relationship between a first layer in which a material having a high refractivity is elongated, and a second layer in which a material having a low refractivity is elongated:

$$n1_x = n1_z = 1.57, \; n1_y = 1.86; \text{ and}$$

$$n2_x = n2_y = n2_z = 1.57.$$

Thus, in case that refractivity values of the first and second layers in the x-direction and the z-direction are identical to each other and refractivity values of the first and second layers in the y-direction are different from each other, when a non-polarized light is incident in the direction perpendicular to the film plane, i.e., z-direction, polarization components in the x-direction are all transmitted, polarization components in the y-direction are all reflected based on Fresnel's equation. A representative example of birefringence dielectric multilayered films having the above characteristics is DBEF (Dual brightness enhancement film) made by 3M company. The DBEF has a multilayered structure in which two kinds of films made of different material are alternately stacked to form a few hundred layers. In other words, polyethylene naphtalate layer having a high birefringence and polymethyl methacrylate (PMMA) layer are alternately stacked to form the DBEF layer. Since naphthalene radical has a flat plane structure, when these radicals are adjacently placed to each other, it is easy to stack the polyethylene naphtalate layer and the DBEF layer, so that the refractivity in the stacking direction becomes considerably different from those in other directions. On the contrary, since the PMMA is an amorphous polymer and is isotropically aligned, the PMMA has an identical refractivity in all directions.

The DBEF made by 3M company transmits all x-directional polarization components and reflects all y-directional polarization components, while the transflective film 180 according to one aspect of the invention mostly reflects a specific-directional (for instance, y-directional) polarization component, but partially reflects and transmits polarization component, which is polarized in a direction (for instance, x-direction) perpendicular to the specific direction. The transflective film 180 may be made by vertically attaching two anisotropic transflective films each having transmissivity and reflectivity varying depending on polarized state and direction of light incident on the transflective film 180. Also, the transflective film 180 may be made by attaching an anisotropic transflective film having various transmissivity and reflectivity depending on polarized state and direction of the incident light and a transflective film having isotropic reflection and transmission characteristics independent of polarized state and direction of incident light. The two transflective films can be made in an integrally formed structure, or made in a separately formed film structure.

Also, according to another aspect of the invention, the transflective film 180 has isotropic reflection and transmission characteristics independent of a polarized state and a direction of the incident light. For instance, if it is assumed that a direction parallel to an elongated direction of the film is x-direction and a direction perpendicular to the elongated direction of the film is y-direction, the first layer 181 having a high refractivity and the second layer 182 having a low refractivity both have a refractive isotropy in x-y plane of the film, and the first and second layers 181 and 182 each have three main refractive indexes, $n_x$, $n_y$ and $n_z$, that satisfy the following relationships:

$$n1_x = n1_y = n1_z; \text{ and}$$

$$n2_x = n2_y = n2_z \neq n1_z \qquad (2).$$

Thus, in case that the first and second layers 181 and 182 have different refractivity index values in the z-direction, when non-polarized light is incident in the direction (i.e., z-direction) perpendicular to the film, polarization components in the x-direction are partially transmitted and reflected, and polarization components in the y-direction are partially transmitted and reflected according to Fresnels's equation. At this time, the reflectivity of the reflected light can be adjusted to match with characteristics of the LCD device by controlling the thickness or the refractivity of the first layer 181 or the second layer 182. In other words, a reflection-characteristic-enhanced LCD device, enhances the reflectivity, whereas an LCD device, in which transmission characteristic is considered to be an important factor, lowers the reflectivity to thereby enhance the transmissvity.

As described above, the transflective film 180 of the invention can be formed to have an anisotropy characteristic in which transmissivity and reflectivity of the film 180 varies with a polarized state and a direction of the incident light, or can be formed to have an isotropy characteristic in which transmissivity and reflectivity of the film 180 do not depend on a polarized state and a direction of the incident light. In any case, it is desirable that the transflective film 180 has a reflectivity of more than or equal to about 4% with respect to polarization component in all directions when light is incident in a direction perpendicular to the film plane.

The transflective film 180 of the invention can be made in an integrally formed structure together with the second polarizing plate 170, or made in a separately formed sheet structure separated from the second polarizing plate 170. In case that the transflective film 180 is made in an integrally formed structure together with the second polarizing plate 170, it is possible to decrease the thickness of a liquid crystal (LC) cell, and the LCD device has an advantage in an aspect of manufacturing cost.

In the above, there is explained a method of forming the transflective film 180 by depositing or coating the polymer multilayered film on a surface of the second polarizing plate 170, which may be contrasted with the anti-reflection treatment in a polarizing plate. In other words, in the anti-reflection treatment, two kinds of transparent films having different refractivity are repeatedly deposited or coated in a constant thickness such that destructive interference occurs by multi-reflection within the polymer multilayered film. However, in order to form a transflective film capable of partially transmitting and partially reflecting an incident light, the film thickness should be adjusted such that constructive interference occurs.

Figure 4A:
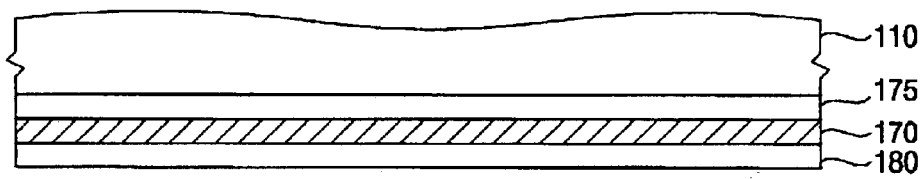
FIGS. 4A to 4C are sectional views for illustrating a position of a light scattering layer that is available for the liquid crystal display device of FIG. 1.
Figure 4B:
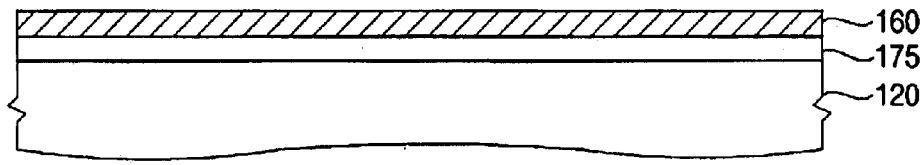
Figure 4C:
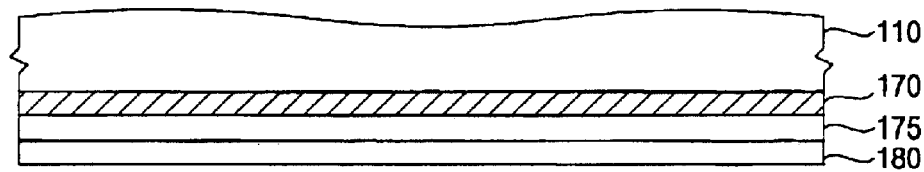

FIGS. 4A and 4B are sectional views for illustrating a position of a light scattering layer that is available for the liquid crystal display device of FIG. 1.

As shown in FIGS. 4A and 4B, the LCD device in accordance with the current embodiment may further include a light scattering layer 175 formed on the first substrate 110 or the second substrate 120 in order to prevent specular reflection and to properly diffuse the reflected light in various angles.

For instance, as shown in FIGS. 4A and 4B, it is possible to form the light scattering layer 175 between the first substrate 110 and the second polarizing plate 170, or between the second substrate 120 and the first polarizing plate 160. It is also possible to form the light scattering layer 175 between the second polarizing plate 170 and the transflective film 180. The light scattering layer 175 may be made in an integrally formed structure together with the second polarizing plate 170 or the first polarizing plate 160, or made in a separate sheet structure separated from the polarizing plates 160, 170. Further, the light scattering layer 175 can be made in the form of a plastic film in which transparent beads are dispersed. Moreover, the light scattering layer 175 can be made in a state in which beads are added to adhesive, which makes it possible to directly attach the first substrate 110 to the second polarizing plate 170.

Furthermore, in order to optimize light efficiency in the LCD device in accordance with the current embodiment of the invention, it is possible to form a phase difference plate (not shown) on the first substrate 110 or the second substrate 120. For instance, the phase difference plate is formed in an integrally formed structure together with polarizing plates 160, 170 or a separate film structure separated from the polarizing plates 160, 170 between the first substrate 110 and the second polarizing plate 170, or between the second substrate 120 and the first polarizing plate 160.

Hereinafter, there is described in detail an operation mechanism of the LCD device having the above structure.

FIG. 5A through FIG. 6B are schematic views for illustrating operation mechanisms of reflection mode and transmission mode in the LCD device in which the transflective film 180 is made an integrally formed structure together with the second polarizing plate 170. Here, polarization directions of the light are represented on the basis of a polarizing axis of the first polarizing plate 160, and partially reflected light and partially transmitted light are represented by a dotted line.

Figure 5A:
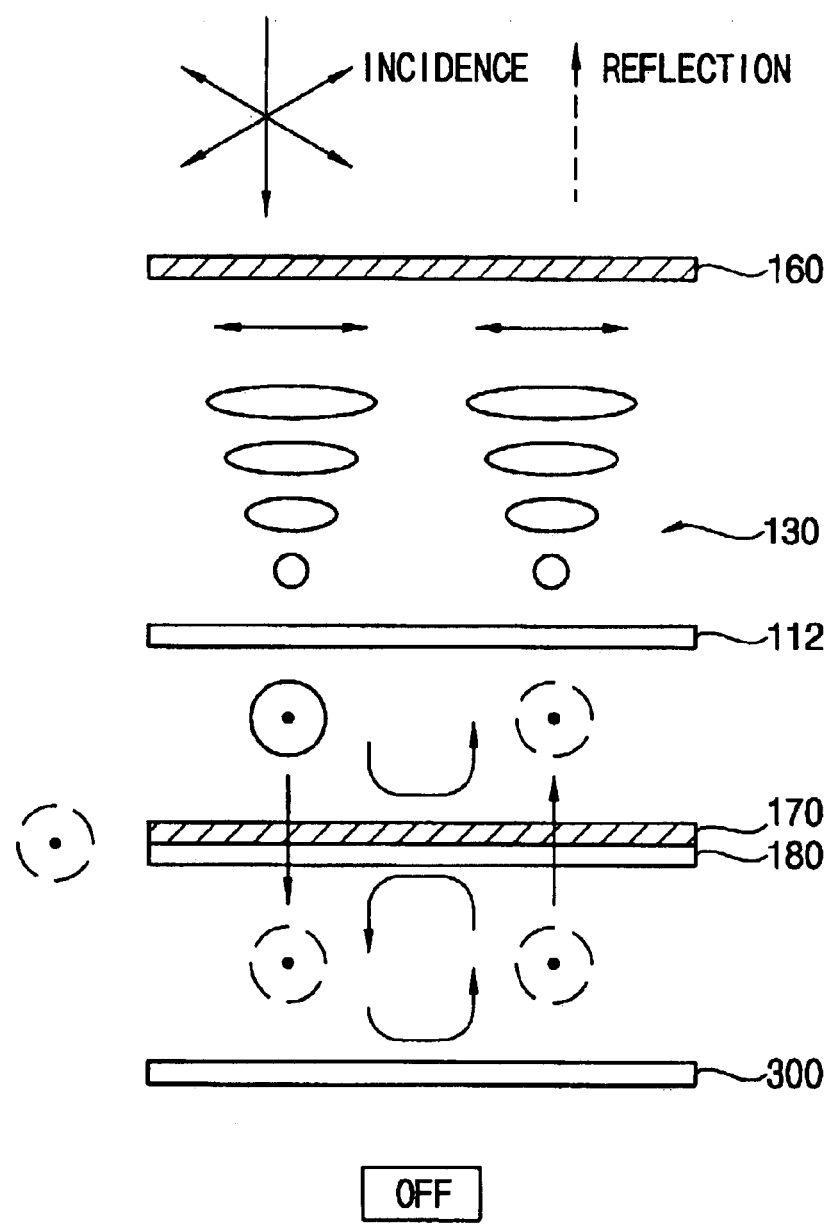
FIGS. 5A and 5B are schematic views for illustrating an operation mechanism of the liquid crystal display device of FIG. 1 for which an integrally formed transflective film is available in the reflection mode.

First, when a pixel voltage is not applied (OFF) in the reflection mode, as shown in FIG. 5A, light that is incident from an external source is transmitted through the first polarizing plate 160, so that the light is linearly polarized in a direction parallel to the polarizing axis of the first polarizing plate 160. The linearly polarized light is transmitted through the liquid crystal layer 130 and the first transparent electrode 112, so that the linearly polarized light is linearly polarized in a direction perpendicular to the polarizing axis of the first polarizing plate 160 and is then incident into the transflective film 180 made in an integrally formed structure together with the second polarizing plate 170. At this time, since the polarizing axis of the second polarizing plate 170 is perpendicular to that of the first polarizing plate 160, the light that is incident into the second polarizing plate 170 comes to have the direction parallel to the polarizing axis of the second polarizing plate 170. Accordingly, the light linearly polarized in the direction parallel to the polarizing axis of the second polarizing plate 170 is partially transmitted through the transflective film 180 and is partially reflected by the transflective film 180. In other words, in case that the transflective film 180 has the refractivity characteristic of the relationship (1), a polarization component, which is polarized in the x-direction parallel to the elongated direction of the transflective film 180, of the light incident into the transflective film 180 is partially transmitted and reflected, whereas a polarization component which is polarized in the direction perpendicular to the elongated direction is mostly reflected. Further, in case that the transflective film 180 has the refractive characteristic of the relationship (2), of the light incident into the transflective film 180, the polarization components which are polarized in the x- and y-directions are partially transmitted and partially reflected.

Thus, the linearly polarized light reflected by the transflective film 180 is transmitted through the first transparent electrode 112 and the liquid crystal layer 130, so that it is linearly polarized in the direction parallel to the polarizing axis of the first polarizing plate 160. Afterwards, the light is transmitted through the first polarizing plate 160, so that a white image is displayed. Also, the light transmitted through the transflective film 180 is restored between the transflective film 180 and the backlight 300, and the restored light is repeatedly subject to the procedure of partial reflection and partial transmission. As a consequence, light loss is eliminated and reflectivity and light efficiency are enhanced.

Figure 5B:
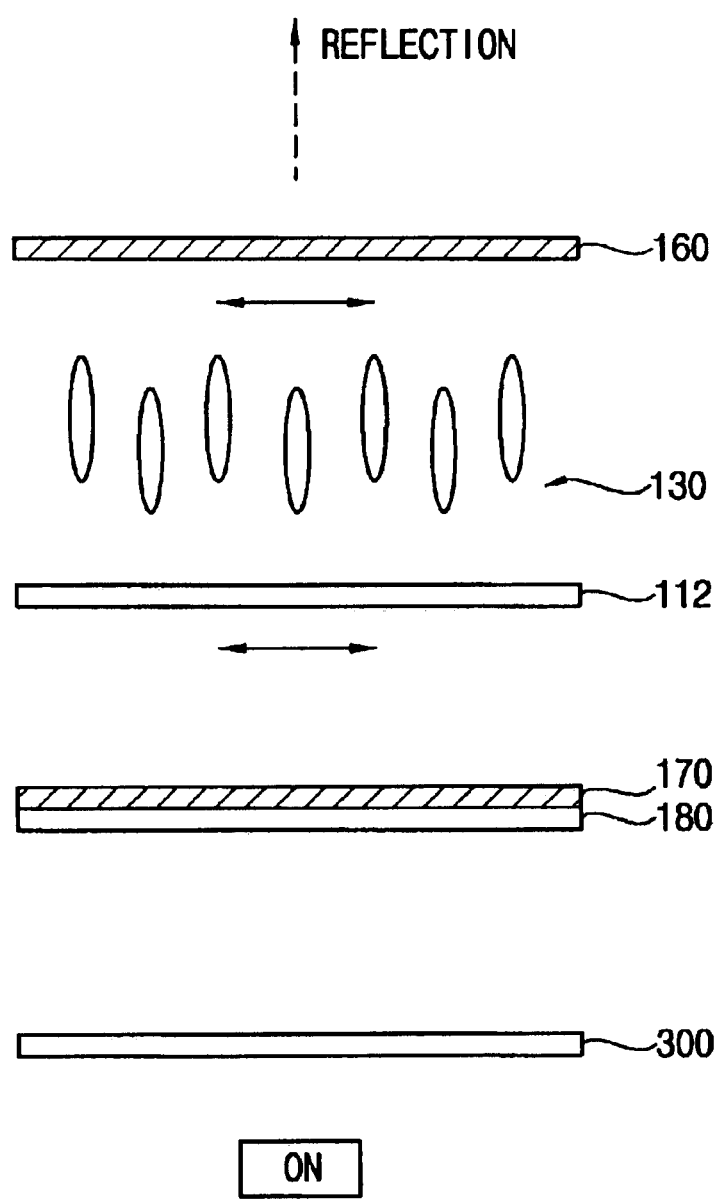

When a maximum pixel voltage is applied (ON) in the reflection mode, as shown in FIG. 5B, light incident from an external source is transmitted through the first polarizing plate 160, so that the light is linearly polarized in a direction parallel to the polarizing axis of the first polarizing plate 160. Afterwards, the linearly polarized light is transmitted through the liquid crystal layer 130 without a variation in the polarized state, and is then incident into the transflective film 180 integrally formed with the second polarizing plate 170. At this time, since the linearly polarized light is perpendicular to the polarizing axis of the second polarizing plate 170, the light is all absorbed in the second polarizing plate 170. Thus, the linearly polarized light is not reflected by the transflective film 180, so that a black image is displayed.

Figure 6A:
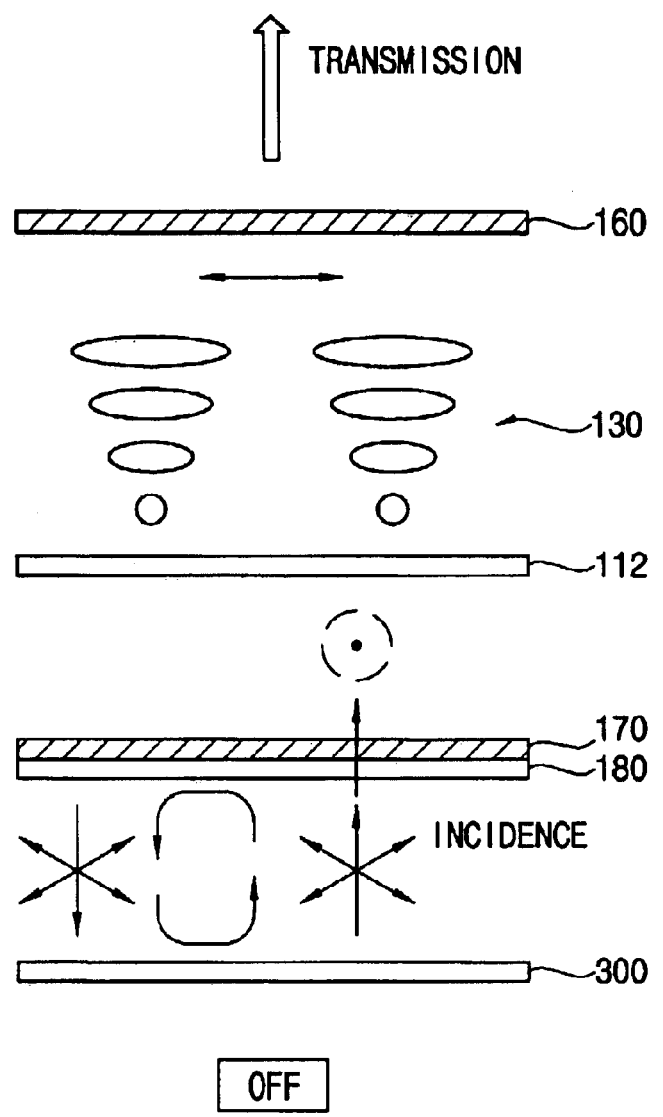
FIGS. 6A and 6B are schematic views for illustrating an operation mechanism of the liquid crystal display device of FIG. 1 for which an integrally formed transflective film is available in the transmission mode.

When a pixel voltage is not applied (OFF) in the transmission mode, as shown in FIG. 6A, light irradiated from the backlight 300 is incident into the transflective film 180 integrally formed with the second polarizing plate 170. In case that the transflective film 180 has the refractive characteristic of the relationship (1), a polarization component, which is polarized parallel to the x-direction, of the light parallel to the polarizing axis of the second polarizing plate 170 is partially transmitted and reflected, whereas a polarization component which is polarized parallel to the y-direction is mostly reflected. Also, in case that the transflective film 180 has the refractive characteristic of the relationship (2), the light, which is parallel to the polarizing axis of the second polarizing plate 170, is partially transmitted and partially reflected because all polarization components which are polarized in the x-direction and y-direction are partially transmitted and reflected.

Thus, the light that has been transmitted through the transflective film 180 and the second polarizing plate 170 becomes a linearly polarized light having a vibrating direction parallel to the polarizing axis of the second polarizing plate 170. The linearly polarized light is transmitted through the first transparent electrode 112 and the liquid crystal 130, so that it is linearly polarized in a direction parallel to the polarizing axis of the first polarizing plate 160. Accordingly, the light linearly polarized in the direction parallel to the polarizing axis of the first polarizing plate 160 is transmitted through the first polarizing plate 160, so that a white image is displayed. Also, light reflected by the transflective film 180 is restored between the backlight 300 and the transflective film 180, and then is repeatedly subject to the above steps. Thus, polarization components parallel to the x-direction or polarization components parallel to the x- and y-directions are successively transmitted through the transflective film 180 to be used, so that light loss is reduced and transmissivity and light efficiency are enhanced.

Figure 6B:
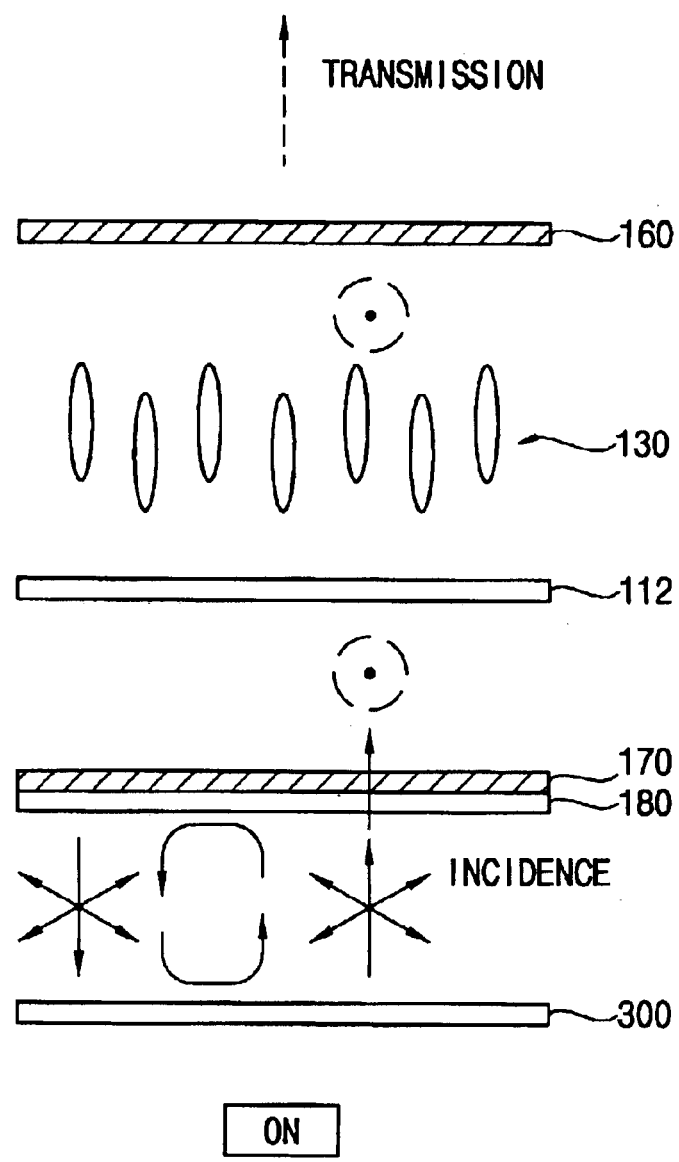

When a maximum pixel voltage is applied (ON) in the transmission mode, as shown in FIG. 6B, light irradiated from the backlight 300 is incident into the transflective film 180 integrally formed with the second polarizing plate 170, so that the light parallel to the polarizing axis of the second polarizing plate 170 is partially transmitted and reflected. The light that has been transmitted through the transflective film 180 and the second polarizing plate 170 is converted into light lineally polarized in the direction parallel to the polarizing axis of the second polarizing plate 170, i.e., in the direction perpendicular to the polarizing axis of the first polarizing plate 160. The linearly polarized light is transmitted through the first transparent electrode 112 and the liquid crystal layer 130 without a variation in the polarized state. Accordingly, the light linearly polarized in the direction perpendicular to the polarizing axis of the first polarizing plate 160 is not transmitted through the first polarizing plate 160, so that a black image is displayed.

FIG. 7A through FIG. 8B are schematic views for illustrating an operation mechanism in the transmission mode and the reflection mode of an LCD device in which the transflective film 180 is separated from the second polarizing plate 170 and is made in a sheet structure. Here, polarization directions of the light are represented on the basis of a polarizing axis of the first polarizing plate 160, and partially reflected light and partially transmitted light by a dotted line.

Figure 7A:
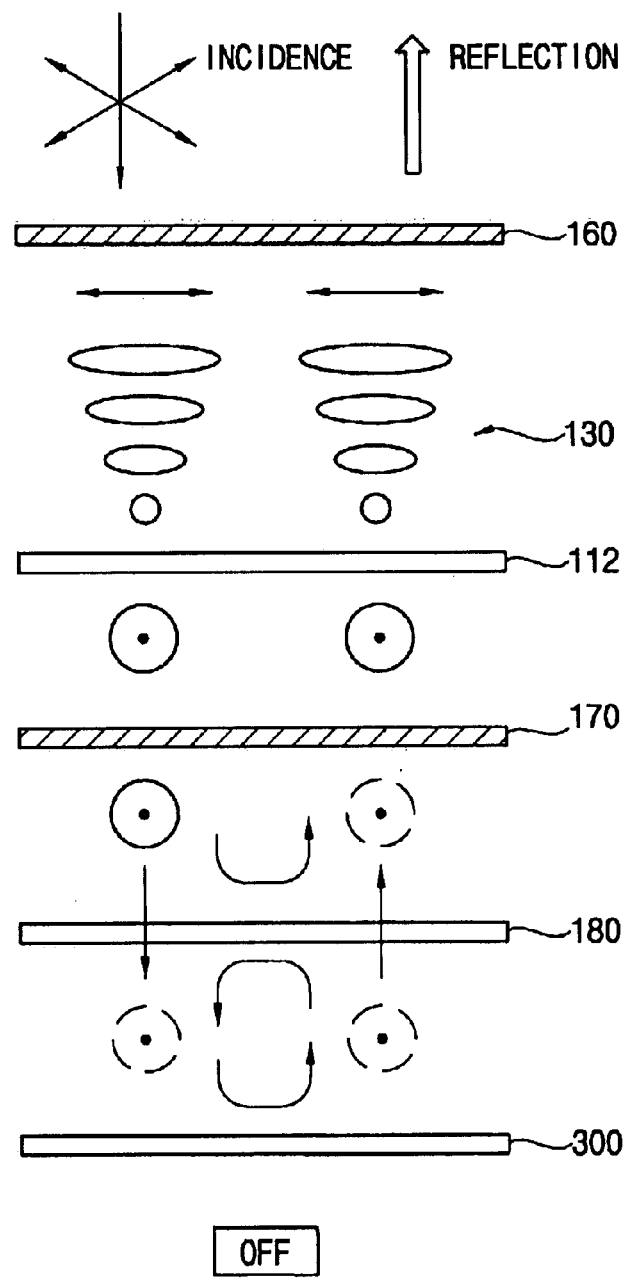
FIGS. 7A and 7B are schematic views for illustrating an operation mechanism of the liquid crystal display device of FIG. 1 for which a separation type transflective film is available in the reflection mode.

First, when a pixel voltage is not applied (OFF) in the reflection mode, as shown in FIG. 7A, light incident from an external source is transmitted through the first polarizing plate 160, so that the light is linearly polarized in a direction parallel to the polarizing axis of the first polarizing plate 160. The linearly polarized light is transmitted through the liquid crystal layer 130 and the first transparent electrode 112, so that the linearly polarized light is linearly polarized in a direction perpendicular to the polarizing axis of the first polarizing plate 160 and is then incident into the second polarizing plate 170. At this time, since the polarizing axis of the second polarizing plate 170 is perpendicular to that of the first polarizing plate 160, the light that has been linearly polarized in a direction perpendicular to the polarizing axis of the first polarizing plate 160 is transmitted through the second polarizing plate 170 and is then incident into the transflective film 180. In case that the transflective film 180 has the refractivity characteristic of the relationship (1), a polarization component, which is polarized in the x-direction parallel to the elongated direction of the transflective film 180, of the light incident into the transflective film 180 is partially transmitted and reflected, whereas a polarization component, which is polarized in the y-direction perpendicular to the elongated direction, is mostly reflected. Further, in case that the transflective film 180 has the refractive characteristic of the relationship (2), of the light incident into the transflective film 180, the polarization components polarized in the x- and y-directions are partially transmitted and partially reflected.

Thus, since the linearly polarized light reflected by the transflective film 180 is parallel to the polarizing axis of the second polarizing plate 170, it is transmitted through the second polarizing plate 170, and is incident into the liquid crystal layer 130 via the first transparent electrode 112. The linearly polarized light is transmitted through the liquid crystal layer 130, whereby it is linearly polarized in the direction parallel to the polarizing axis of the first polarizing plate 160. Afterwards, the light is transmitted through the first polarizing plate 160, so that a white image is displayed. Also, the lights that have been transmitted through the transflective film 180 are restored between the transflective film 180 and the backlight 300, and the restored light is repeatedly subject to the procedure of a partial reflection and a partial transmission. As a consequence, light loss is reduced and reflectivity and light efficiency are enhanced.

Figure 7B:
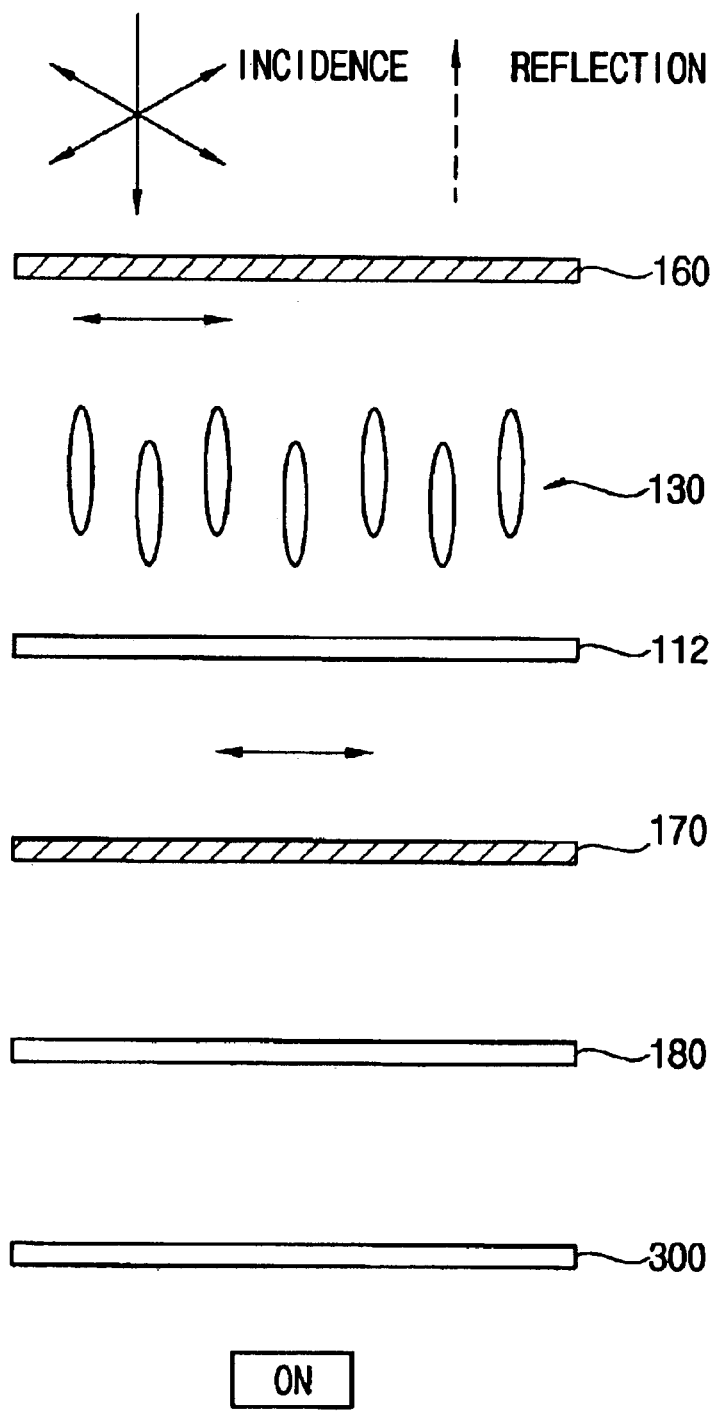

When a maximum pixel voltage is applied (ON) in the reflection mode as shown in FIG. 7B, light incident from an external source is transmitted through the first polarizing plate 160, so that the light is linearly polarized in a direction parallel to the polarizing axis of the first polarizing plate 160. Afterwards, the linearly polarized light is transmitted through the liquid crystal layer 130 without a variation in the polarized state, and is then incident into the second polarizing plate 170. At this time, since the linearly polarized light is perpendicular to the polarizing axis of the second polarizing plate 170, the light is all absorbed in the second polarizing plate 170. Thus, since the linearly polarized light is not reflected by the transflective film 180, a black image is displayed.

Figure 8A:
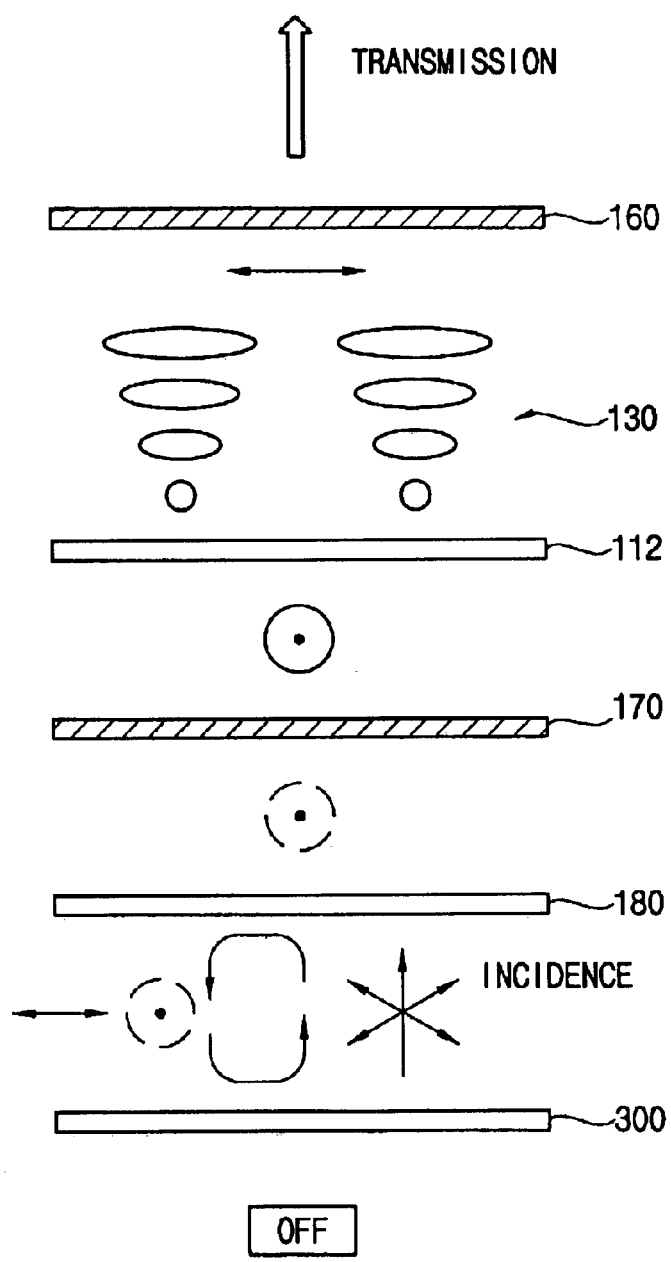
FIGS. 8A and 8B are schematic views for illustrating an operation mechanism of the liquid crystal display device of FIG. 1 for which a separation type transflective film is available in the transmission mode.

When a pixel voltage is not applied (OFF) in the transmission mode, as shown in FIG. 8A, light irradiated from the backlight 300 is incident into the transflective film 180, so that the light is partially transmitted and reflected. In case that the transflective film 180 has the refractive characteristic of the relationship (1), polarization component, which is polarized in the x-direction parallel to the elongated direction of the transflective film 180, of the light that have been incident into the transflective film 180 is partially transmitted and reflected, whereas polarization components, which are polarized in the y-direction perpendicular to the elongated direction, are mostly reflected. Also, in case that the transflective film 180 has the refractive characteristic of the relationship (2), polarization components, which is polarized in the x- and y-directions, of the light incident into the transflective film 180 is partially transmitted and reflected.

Thus, the light that has been transmitted through the transflective film 180 and the second polarizing plate 170 is linearly polarized in a direction parallel to the polarizing axis of the second polarizing plate 170. Afterwards, the linearly polarized light is transmitted through the first transparent electrode 112 and the liquid crystal 130, so that it is linearly polarized in a direction parallel to the polarizing axis of the first polarizing plate 160. Accordingly, the light linearly polarized in the direction parallel to the polarizing axis of the first polarizing plate 160 is transmitted through the first polarizing plate 160, so that a white image is displayed. Also, light reflected by the transflective film 180 is restored between the backlight 300 and the transflective film 180, and then is repeatedly subject to the above steps. Thus, polarization components polarized parallel to the x-direction or polarization components polarized parallel to the x- and y-directions successively are transmitted through the transflective film 180 and are used, so that light loss is reduced and transmissivity and light efficiency are enhanced.

Figure 8B:
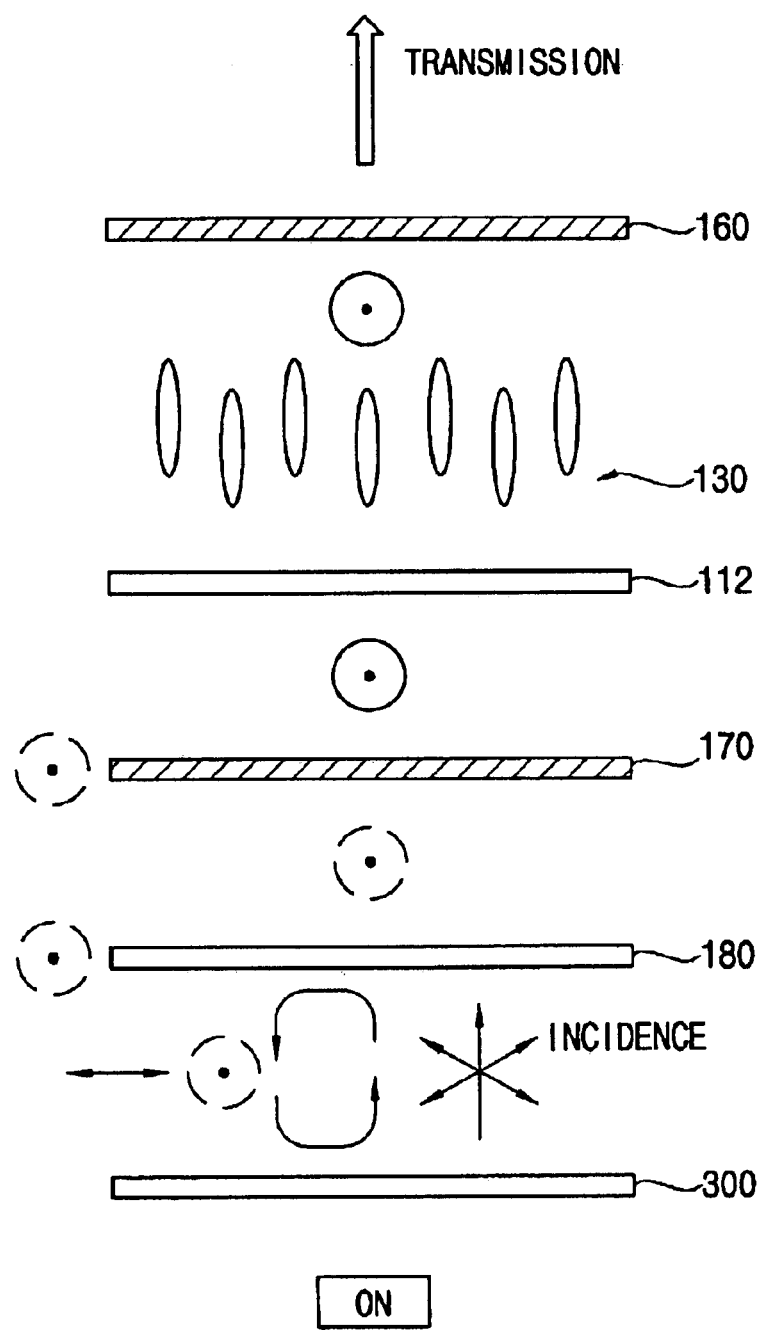

When a maximum pixel voltage is applied (ON) in the transmission mode, as shown in FIG. 8B, light irradiated from the backlight 300 is incident into the transflective film 180, so that the incident light is partially transmitted through the transflective film 180 and is partially reflected by the transflective film 180. The light that has been transmitted through the transflective film 180 is transmitted through the second polarizing plate 170, so that it is converted into light lineally polarized parallel to the polarizing axis of the second polarizing plate 170, i.e., a direction perpendicular to the polarizing axis of the first polarizing plate 160. Afterwards, the linearly polarized light is transmitted through the first transparent electrode 112 and the liquid crystal layer 130 without a variation in the polarized state. Accordingly, the light linearly polarized in the direction perpendicular to the polarizing axis of the first polarizing plate 160 cannot be transmitted through the first polarizing plate 160, so that a black image is displayed.

Figure 9:
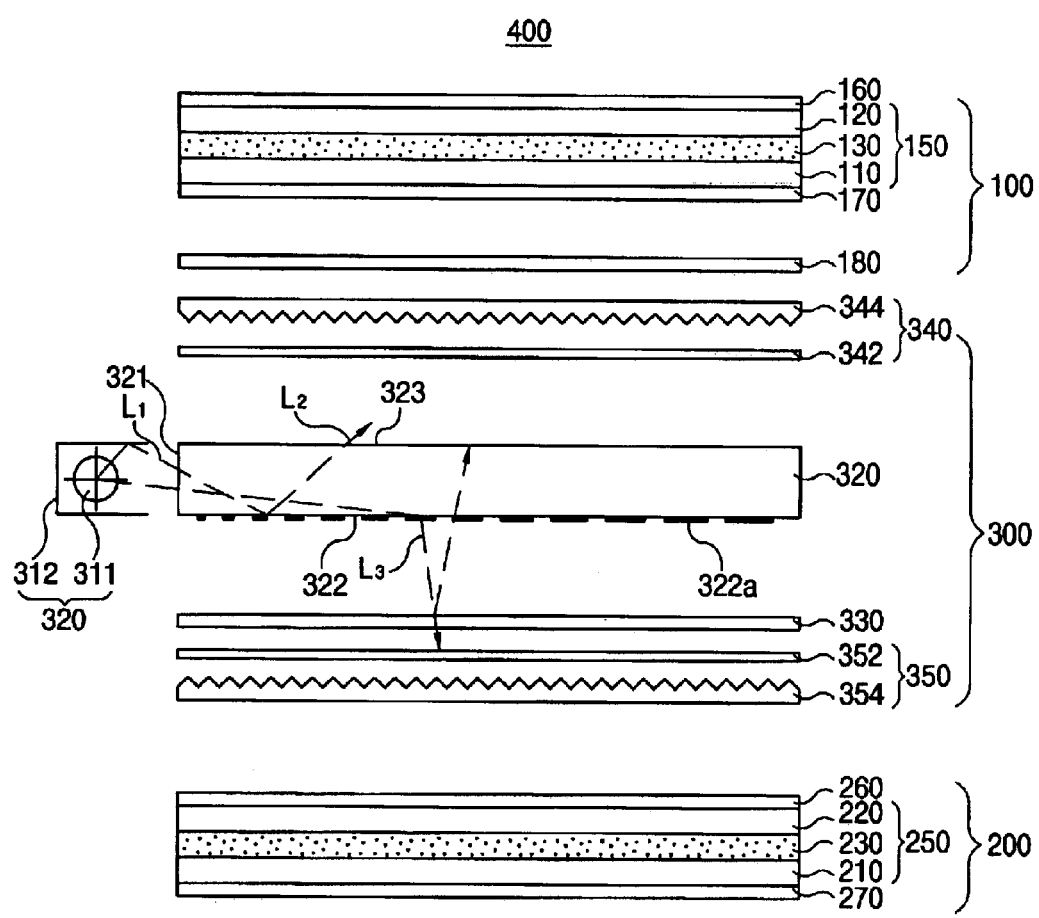
FIG. 9 is a schematic view showing a structure of a liquid crystal display device of FIG. 1 further including a light reflection pattern and optical sheets.
Figure 10:
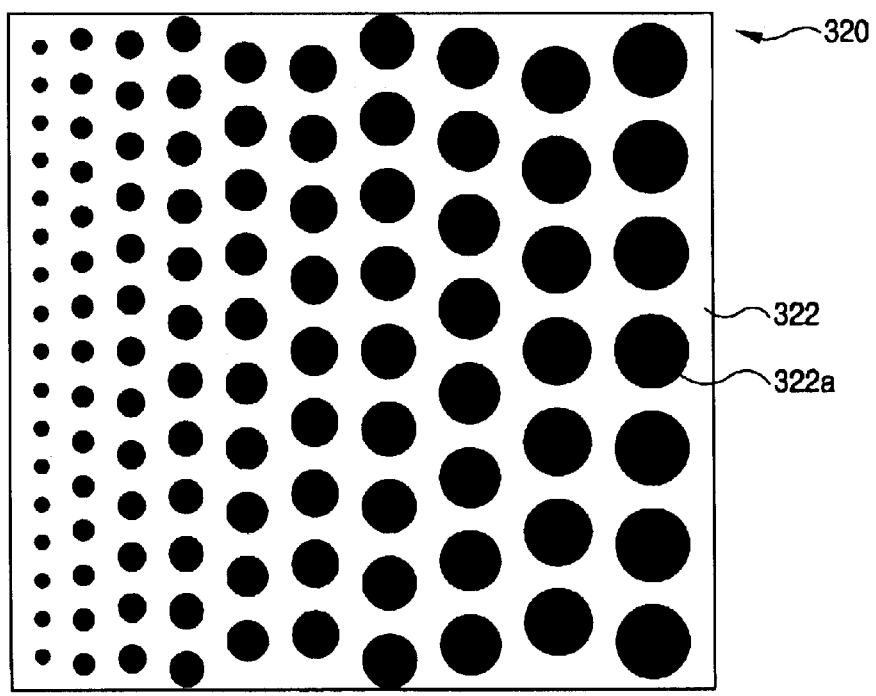
FIG. 10 is a plane view showing the light reflection pattern formed on a light guiding member of FIG. 9.

FIG. 9 is a schematic view showing a structure of a liquid crystal display device further including a light reflection pattern and optical sheets, and FIG. 10 is a plane view showing the light reflection pattern formed on a light guiding member of FIG. 9.

Referring to FIG. 9, a light reflection pattern 322a is formed on the reflective-transmissive face 322 of the light guiding member 320 so as to face the luminance controlling member 330. The light reflection pattern 322a partially reflects the light that is incident onto the light reflective-transmissive face 322, and changes the light path of the light incident onto the light reflective-transmissive face 322 so that a part of the light incident onto the light reflective-transmissive face 322 may proceed toward a light exiting face 323.

The light reflection pattern 322a is formed on the light reflective-transmissive face 322. For example, the light reflection pattern 322a includes a plurality of dots arranged in a matrix shape on the light reflective-transmissive face 322. Paste mixed with material having a high light reflectivity is printed on the light reflective-transmissive face 322 by a silk screen printing method, so that light reflection pattern 322a is formed on the light reflective-transmissive face 322.

The light reflection pattern 322a formed on the light reflective-transmissive face 322 may have various patterns with certain regularity. For example, the dots of the light reflection pattern 322a are arranged in a matrix shape on the light reflective-transmissive face 322, and the size of the respective dots increases in proportion to the distance between each dot and the light incident face 321. In other words, the dots of the light reflection pattern 322a have different sizes such that a dot has a smaller size as it is closer to the light incident face 321. The size of a dot of the light reflection pattern 322a is determined according to the distance between the dot and the light incident face 321, so that the light reflectivity by the light reflection pattern 322a is maintained substantially uniform over the entire surface of the light reflective-transmissive face 322.

Referring again to FIG. 9, in the light guiding member 320 of this embodiment, a vertical distance between the light reflective-transmissive face 322 and the light exiting face 323 is substantially uniform. In other words, the light reflective-transmissive face 322 is substantially parallel with the light exiting face 323.

In another embodiment, however, the light reflective-transmissive face 322 may not be parallel with the light exiting face 323. Specifically, the vertical distance between the light reflective-transmissive face 322 and the light exiting face 323 decreases in proportion to the distance between a point on the light exiting face 323 (or the light reflective-transmissive face 322) and the light incident face 321. Preferably, the vertical distance between the light reflective-transmissive face 322 and the light exiting face 323 decreases gradually. For example, the light exiting face 323 is parallel with the LCD panel, and the light reflective-transmissive face 322 is tilted by a predetermined angle with respect to the light exiting face 323.

On the other hand, as shown in FIG. 9, a first optical sheet 340 is installed on the light exiting face 323 of the light guiding member 320 so as to enhance optical characteristic of the light exiting from the light guiding member 320 by changing optical distribution of the light exiting from the light guiding member 320. The first optical sheet 340 further includes a first diffusion sheet 342 and a first prism sheet 344. Specifically, the first diffusion sheet 342 disperses the second light L2 and a part of the third light L3 reflected by the luminance controlling member 330, to thereby provide a uniform luminance distribution. According to one exemplary embodiment of the present invention, at least one first prism sheet 344 is installed on the first diffusion sheet 342, to thereby enhance a viewing angle of the light exited from the first diffusion sheet 342 by correcting a direction of the light exited from the first diffusion sheet 342.

In addition, a second optical sheet 350 may be installed between the luminance controlling member 330 and the second LCD panel 200 so as to enhance optical characteristic of the other part of the third light L3 transmitting the luminance controlling member 330 and then proceeding toward the second LCD panel by changing optical distribution of the other part of the third light L3. The second optical sheet 350 may further include a second diffusion sheet 352 and a second prism sheet 354. Specifically, the second diffusion sheet 352 disperses the other part of the third light L3, to thereby provide a uniform luminance distribution. The second prism sheet 354 corrects a direction of the light exited from the second diffusion sheet 352, to thereby enhance a viewing angle of the light exited from the second diffusion sheet 352.

Although the first display unit 100 has the same size as the second display unit 200 in the embodiments in FIGS. 1 to 9, the first display unit 100 may have a different size from the second display unit 200.

Figure 11:
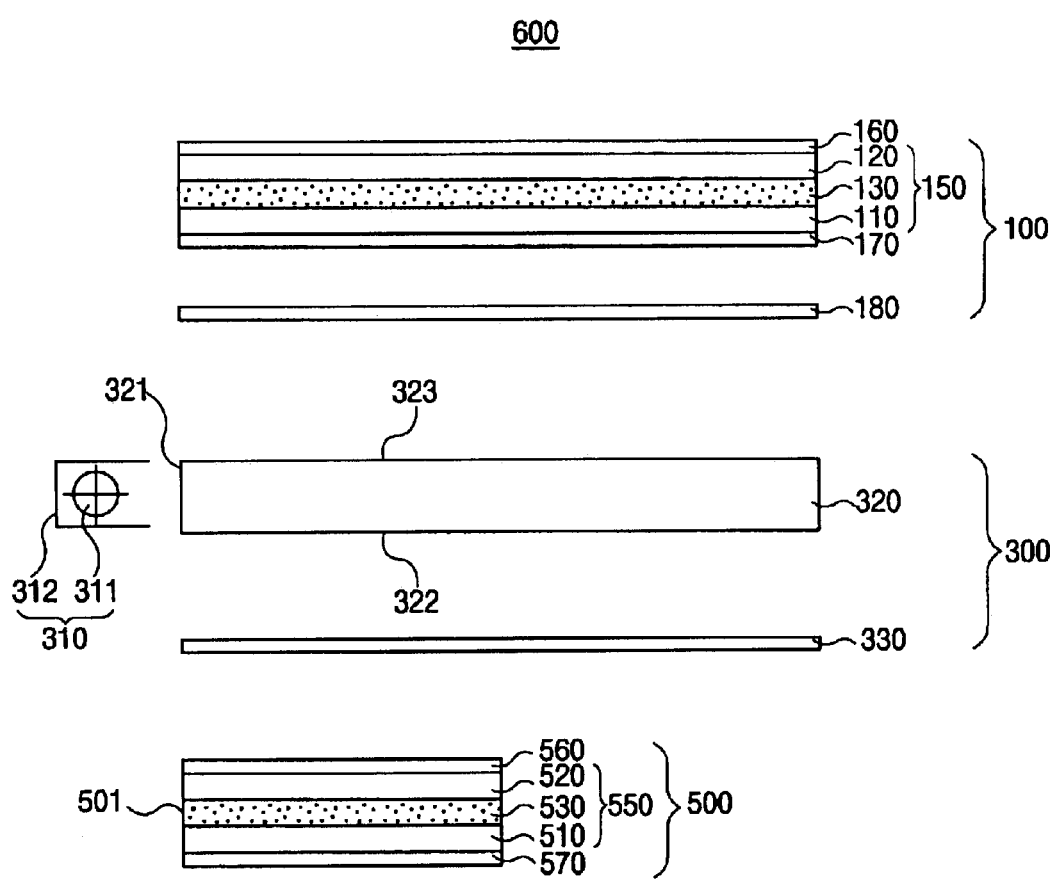
FIG. 11 is a sectional view showing a liquid crystal display device according to another exemplary embodiment of the present invention.

FIG. 11 is a sectional view showing a liquid crystal display device according to another exemplary embodiment of the present invention.

Referring to FIG. 11, an LCD device 600 includes a first display unit 100, a second display unit 500 having a different size from the first display unit 100, and a backlight 300 disposed between the first and second display units 100, 500.

A first display area of the first display unit 100 is different from a second display area of the second display unit 500, and in this embodiment, the first display area of the first display unit 100 is larger than the second display area of the second display unit 500.

When the first display area of the first display unit 100 is larger than the second display area of the second display unit 500, optical characteristic of the second display unit 500 varies according to a position of the second display unit 500.

As shown in FIG. 11, one end of the second display unit 500 is aligned to the light incident face 321 of the light guiding member 320. When one end of the second display unit 500 is aligned to the light incident face 321 of the light guiding member 320, a larger amount of light can be collected at the second display unit 500 compared with when one end of the second display unit 500 is located at other positions.

Although not shown in FIG. 11, one end of the second display unit 500 can be installed apart from the light incident face 321 by a predetermined distance. For example, the second display unit 500 is disposed at the center portion of the light reflective-transmissive face 322 of the light guiding member 320. In this case, there is a disadvantage that restriction on luminance exists, but there is an advantage that restriction on installation is reduced. In addition, the other end of the second display unit 500 opposite to the one end of the second display unit 500 may be aligned to a side face, opposite to the light incident face 321, of the light guiding member 320.

Figure 13:
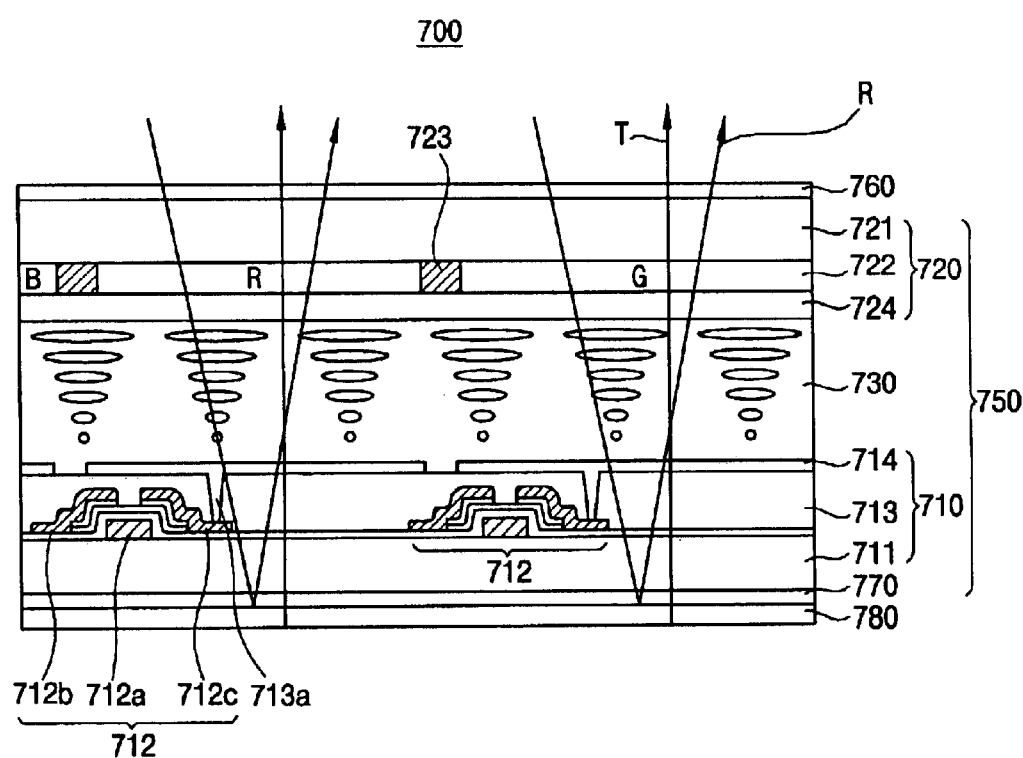
FIG. 13 is a view showing a first display unit of FIG. 12.

FIG. 12 is a sectional view showing a liquid crystal display device according to another exemplary embodiment of the present invention, and FIG. 13 is a view showing a first display unit of FIG. 12.

Referring to FIG. 12, an LCD device 900 includes a first display unit 700 for displaying first images, a second display unit 200 for displaying second images, and a backlight 800 disposed between the first and second display units 700, 200. The first display unit 700 includes a first LCD panel 750, a first polarizing plate 760, a second polarizing plate 770 and a transflective film 780.

Referring to FIG. 13, the first LCD panel 750 includes a first substrate 710, a second substrate 720 arranged facing the first substrate 710, a liquid crystal layer 730 disposed between the first substrate 710 and the second substrate 720.

Specifically, the first substrate 710 includes a first insulating substrate 711. On the first insulating substrate 711 is formed a plurality of switching devices, or thin film transistors (TFTs) 712 and a first transparent electrode (or pixel electrode) 714 electrically connected to the TFTs 712. The TFTs 712 are arranged in a matrix configuration on the first insulating substrate 711. A gate electrode 712a of the TFT 712 is connected a gate line (not shown) extended in a row direction on the first insulating substrate 711, and a source electrode 712b of the TFT 712 is connected a data line (not shown) extended in a column direction on the first insulating substrate 711. A drain electrode 712c of the TFT 712 is electrically connected the first transparent electrode 714 made of a conductive oxidation film such as indium tin oxide (ITO).

An organic insulating layer 713 is formed between the TFT 712 and the first transparent electrode 714. The organic insulating layer 713 includes a contact hole 713a that exposes the drain electrode 712c. The organic insulating layer 713 insulates the TFT 712 and the first transparent electrode 714, and simultaneously allows the first transparent electrode 714 to contact only the drain electrode 712c.

The second substrate 720 includes a second insulating substrate 721. An RGB color filter 722, a black matrix (BM) layer 723 and a second transparent electrode 724 are formed on the second insulating substrate 721. On the second insulating substrate 721, the RGB color filter 722 is arranged in a matrix configuration corresponding to the pixel electrode 714 formed on the first insulating substrate 711. The black matrix layer 723 is formed between the RGB color filter 722 on the second insulating substrate 721 so as to enhance contrast ratio (C/R). In addition, a second transparent electrode 724 is formed on the entire surface of the second insulating substrate on which the RGB color filter 722 is formed.

The first transparent electrode 714 of the first substrate 710 is arranged facing the second transparent electrode 724 of the second substrate 720. A liquid crystal layer 730 is made of 90° twisted TN (Twisted Nematic) liquid crystal composition, and the liquid crystal 730 is disposed between the first substrate 710 and the second substrate 720.

On an upper surface of the first LCD panel 750 is disposed a first polarizing plate 760, and a second polarizing plate 770 is disposed on a lower surface of the first LCD panel 750. Under the second polarizing plate 770 is disposed a transflective film 780 including at least two transparent layers, which have different refractivity index values from each other and are alternately stacked on the second polarizing plate 770. The transflective film 780 partially reflects and partially transmits light incident thereto. Accordingly, the LCD device can display images through a reflection light path (R) and a transmission light path (T).

Referring again to FIG. 12, the second display unit 200 includes a second LCD panel 250, a third polarizing plate 260 and a fourth polarizing plate 270. The second LCD panel includes a third substrate 210, a fourth substrate 220 arranged facing the third substrate 210, and a second liquid crystal layer 230 disposed between the third substrate 210 and the fourth substrate 220. On an upper surface of the second LCD panel 250 is disposed a third polarizing plate 260, and a fourth polarizing plate 270 is disposed on a lower surface of the second LCD panel 250.

Although not shown in FIG. 12, the second LCD panel 250 can be embodied same as the first LCD panel 750 of FIG. 13.

A backlight 800 is disposed between the first and second display units 700, 200. The backlight 800 generates light and provides the first and second display units 700, 200 with the generated light.

The backlight 800 includes a lamp unit 820, a first light guiding member 820, a second light guiding member 830, and a luminance controlling member 840 disposed between the first and second light guiding members 820, 830. The lamp unit 810 includes a lamp 811 for generating light, and a lamp reflector 812 for reflecting the light generated from the lamp 811 to provide the first and second light guiding members 820, 830 with the light generated from the lamp 811. A part of the light generated from the lamp 811, or the first light L1, is incident onto the first light guiding member 820, and the other part of the light generated from the lamp 811, or the second light L2, is incident onto the second light guiding member 830.

The first light guiding member 820 includes four first side faces including a first light incident face 821, a first light reflective-transmissive face 822 and a first light exiting face 823. The first light exiting face 823 faces the first light reflective-transmissive face 822.

The first light L1 incident into the first light guiding member 820 through the first light incident face 821 is divided to proceed toward the first and the second display units 700, 200 by the following path. The first light guiding member 820 divides the first light L1 to exit third and fourth lights L3, L4. The first light guiding member 820 exits the third light L3 or a part of the first light L1 toward the first display unit 700, and exits the fourth light L4 or the other part of the first light L1 toward the second display unit 200. Specifically, the third light L3 includes light exiting directly from the first light exiting face 823 and light being reflected by the first light reflective-transmissive face 822 to exit through the first light exiting face 823. The fourth light L4 passes through the first light reflective-transmissive face 822 to proceed toward the second display unit 200.

The second light guiding member 830 is disposed between the first and second display units 700, 200, and more specifically is disposed in the vicinity of the first reflective-transmissive face 822. The second light guiding member 830 includes four second side faces including a second light incident face 831 onto which the second light L2 is incident, a second light reflective-transmissive face 832 and a second light exiting face 833. The second light exiting face 833 faces the second light reflective-transmissive face 832.

The second light L2 incident into the second light guiding member 830 through the second light incident face 831 is divided to proceed toward the first and second display units 700, 200 by the following path. The second light guiding member 830 divides the second light L2 to exit fifth and sixth lights L5, L6. The second light guiding member 830 exits the sixth light L6 or a part of the second light L2 toward the first display unit 700, and exits the fifth light L5 or the other part of the second light L2 toward the second display unit 200. Specifically, the fifth light L5 includes light exiting directly from the second light exiting face 833 and light being reflected by the second light reflective-transmissive face 832 to exit through the second light exiting face 833. The sixth light L6 passes through the second light reflective-transmissive face 832 to proceed toward the first display unit 700.

A luminance controlling member 840 is installed between the first light guiding member 820 and the second light guiding member 830. The luminance controlling member 840 may have a sheet shape or a plate shape thicker than the sheet shape, and is made of, for example, polyethylene terephthalate (PET) treated by foaming agent.

The fourth light L4, which passes through the first light reflective-transmissive face 822 of the first light guiding member 820, and the sixth light L6, which passes through the second light reflective-transmissive face 832 of the second light guiding member 830, reach the luminance controlling member 840. The luminance controlling member 840 reflects a part of the fourth light L4 to provide the first display unit 700 with the reflected part of the fourth light L4 through the first light guiding member 820, and transmits the other part of the fourth light L4 to provide the second display unit 200 with the other part of the fourth light L4. In addition, the luminance controlling member 840 reflects a part of the sixth light L6 to provide the second display unit 200 with the reflected part of the sixth light L6 through the second light guiding member 830, and transmits the other part of the sixth light L6 to provide the first display unit 700 with the other part of the sixth light L6.

A first luminance at the first display unit 700 and a second luminance at the second display unit 200 are precisely controlled by controlling the light reflectivity and the light transmissivity of the luminance controlling member 840. Thus, a ratio of the first luminance to the second luminance can be precisely controlled by controlling the light reflectivity and the light transmissivity of the luminance controlling member 840.

In this embodiment, the first light guiding member 820 is a flat type light guiding plate, in which a vertical distance between the first light reflective-transmissive face 822 and the first light exiting face 823 is substantially uniform. The second light guiding member 830 is also a flat type light guiding plate. However, the first and second light guiding members may have a wedge shape, in which the vertical distance between the light reflective-transmissive face and the light exiting face varies gradually.

Figure 14:
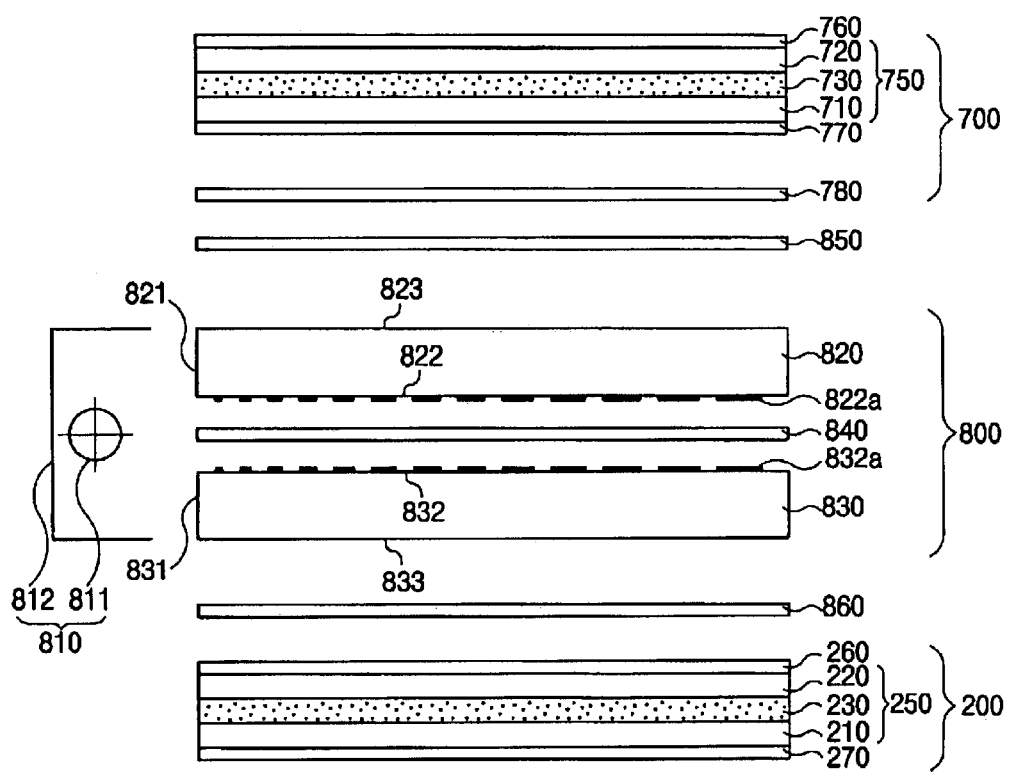
FIG. 14 is a schematic view showing a structure of the liquid crystal display device of FIG. 12 further including light reflection patterns and optical sheets.

FIG. 14 is a schematic view showing a structure of the liquid crystal display device of FIG. 12 further including light reflection patterns and optical sheets.

Referring to FIG. 14, a first light reflection pattern 822*a* is formed on the first reflective-transmissive face 822 of the first light guiding member 820, and a second light reflection pattern 832*a* is formed on the second reflective-transmissive face 832 of the second light guiding member 830. For example, the first and second light reflection patterns 822*a*, 832*a* include a plurality of dots arranged in a matrix shape.

The size of the respective dots of the first light reflection pattern 822*a* successively increases in proportion to the distance between a dot of the first light reflection pattern 822*a* and the first light incident face 821. The size of the respective dots of the second light reflection pattern 832*a* successively increases in proportion to the distance between a dot of the second light reflection pattern 832*a* and the second light incident face 831.

On the other hand, as shown in FIG. 14, the backlight 800 further includes a first optical sheet 850 and a second optical sheet 860. Specifically, the first optical sheet 850 is installed between the first display unit 700 and the first light exiting face 823, and the second optical sheet 860 is installed between the second display unit 200 and the second light exiting face 833.

The first optical sheet 850 enhances a viewing angle of a part of the third light L3 and a part of the fourth light L4, and diffuses the part of the third light L3 and the part of the fourth light L4 so as to provide a uniform luminance distribution. The second optical sheet 860 enhances a viewing angle of a part of the fifth light L5 and a part of the sixth light L6, and diffuses the part of the fifth light L5 and the part of the sixth light L6 so as to provide a uniform luminance distribution.

Figure 15:
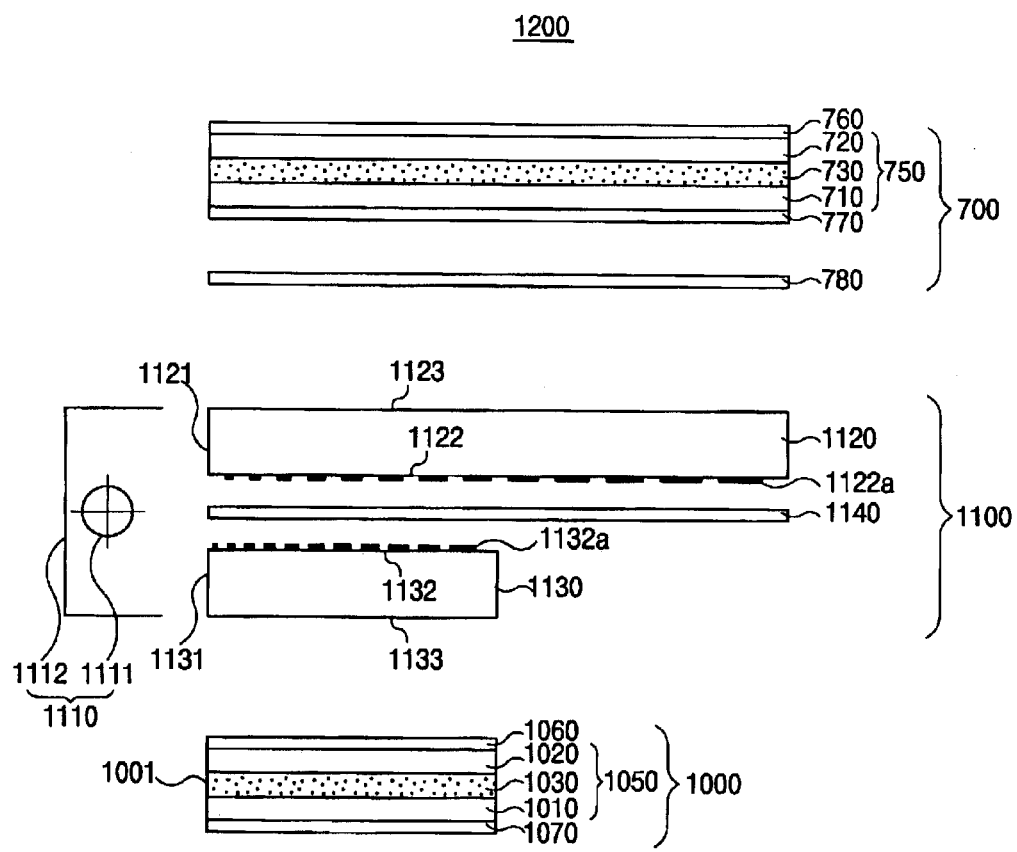
FIG. 15 is a sectional view showing a liquid crystal display device according to another exemplary embodiment of the present invention.

FIG. 15 is a sectional view showing a liquid crystal display device according to another exemplary embodiment of the present invention.

Referring to FIG. 15, an LCD device 1200 includes a first display unit 700, a second display unit 1000 having a different size from the first display unit 700, and a backlight 1100 disposed between the first and second display units 700, 1000.

In this embodiment, a first display area of the first display unit 700 is larger than a second display area of the second display unit 1000, and the first and second light guiding members 1120, 1130 each have a size fit to the first and the second display areas, respectively. The surface area of the first light guiding member 1120 is larger than that of the second light guiding member 1130. In another embodiment, however, the first display area of the first display unit may be smaller than the second display area of the second display unit.

A luminance controlling member 1140 is disposed between the first and second light guiding members 1120, 1130. The surface area of the luminance controlling member 1140 corresponds in its size to that of the first light guiding member 1120, or corresponds to the largest one of the surface areas of the first and second light guiding members 1120, 1130.

As shown in FIG. 15, a first light reflection pattern 1122a is formed on a first reflective-transmissive face 1122 of the first light guiding member 1120, and a second light reflection pattern 1132a is formed on the second reflective-transmissive face 1132 of the second light guiding member 1130. In this embodiment, the first and second light reflection patterns 1122a, 1132a each include a plurality of dots arranged in a matrix shape. Since the surface area of the first light guiding member 1120 is larger than that of the second light guiding member 1130, a configuration of the first light reflection pattern 1122a formed on the first reflective-transmissive face 1122 differs from the configuration of the second light reflection pattern 1132a formed on the second reflective-transmissive face 1132.

For example, the size of the respective dots of the first (or second) light reflection pattern 1122a (1132a) successively increases in proportion to the distance between a dot of the first (or second) light reflection pattern 1122a (1132a) and a first (or second) light incident face 1121 (1131), but the size of the respective dots of the first light reflection pattern 1122a differs from the size of the respective dots of the second light reflection pattern 1132a. In other words, the dots of the second reflection pattern 1132a have sizes with a higher ratio of a size change to a unit distance change than those of the dots of the first reflection pattern 1122a.

Although not shown in FIG. 15, the backlight 1100 may further include a first optical sheet and a second optical sheet. The first optical sheet may be installed between the first display unit 700 and the first light exiting face 1123, and the second optical sheet may be installed between the second display unit 1000 and the second light exiting face 1133. Preferably, the surface areas of the first and second optical sheets are in their size to those of the first and second light guiding members 1120, 1130, respectively.

Figure 16:
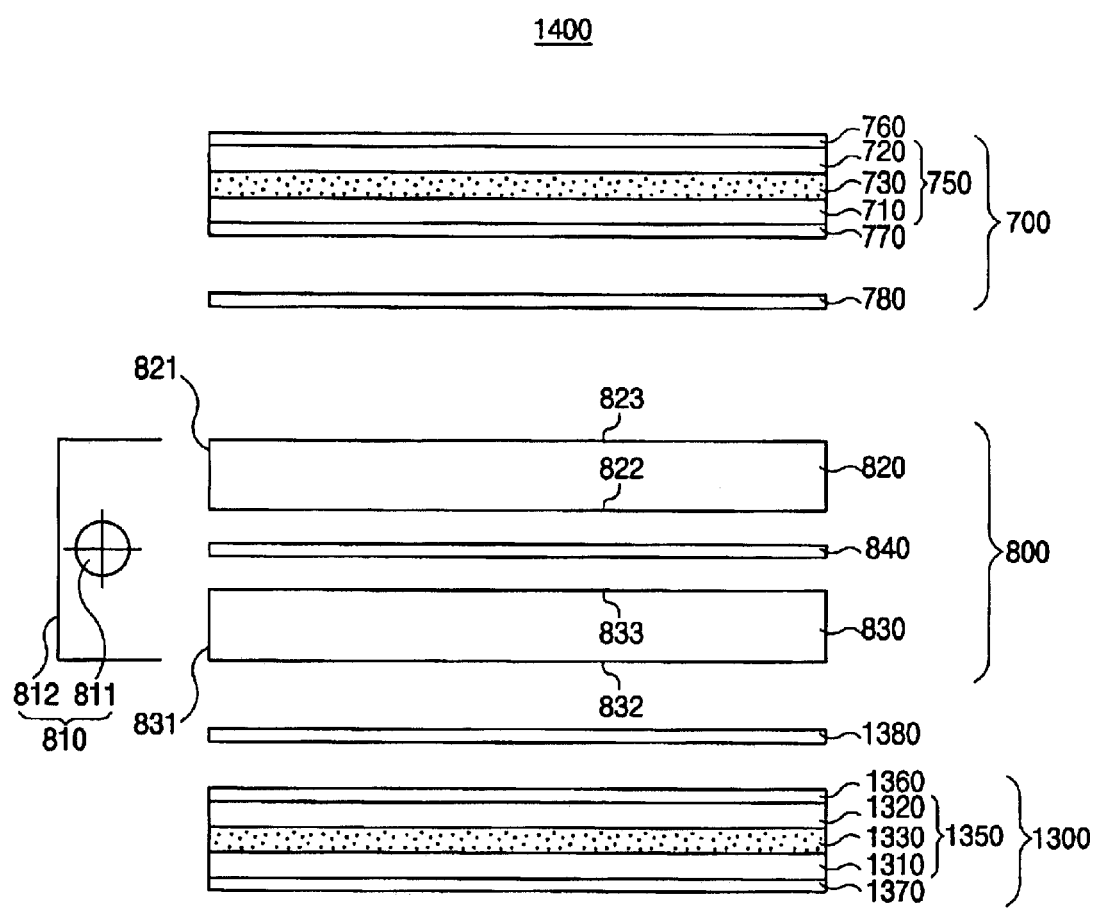
FIG. 16 is a sectional view showing a liquid crystal display device according to another exemplary embodiment of the present invention.

FIG. 16 is a sectional view showing a liquid crystal display device according to another exemplary embodiment of the present invention.

Referring to FIG. 16, an LCD device includes a first display unit 700, a second display unit 1300, and a backlight 800 disposed between the first and second display units 700, 1300.

The first display unit 700 includes a first LCD panel 750, a first polarizing plate 760, a second polarizing plate 770 and a first transflective film 780. The second display unit 1300 includes a second LCD panel 1350, a third polarizing plate 1360, a fourth polarizing plate 1370 and a second transflective film 1380.

Under the second polarizing plate 770, or between the second polarizing plate 770 and the backlight 800, is disposed a first transflective film 780 including at least two transparent layers having different refractivity index values from each other, i.e., a first layer and a second layer alternately stacked to form more than or equal to two layers. The first transflective film 780 partially reflects and partially transmits light incident thereto. Accordingly, the first display unit 700 displays images using the reflected light and the transmitted light.

Between the third polarizing plate 1360 and the backlight 800, is disposed a second transflective film 1380 including at least two transparent layers having different refractivity index values from each other, i.e., a first layer and a second layer alternately stacked to form more than or equal to two layers. The second transflective film 1380 partially reflects and partially transmits light incident thereto. Accordingly, the second display unit 1300 displays images using the reflected light and the transmitted light.

While the present invention has been described in detail, it should be understood that various changes, substitutions and alterations can be made hereto without departing from the spirit and scope of the invention as defined by the appended claims.

What is claimed is:

1. A liquid crystal display device comprising:
   a first display unit including:
      a first liquid crystal display panel having a first substrate, a second substrate and a first liquid crystal layer between the first and second substrates, and
      a transflective film disposed under the first liquid crystal display panel, the transflective film having a plurality of layers in which a first layer and a second layer each having a different refractivity index are alternately stacked, so that the transflective film partially reflects and partially transmits an incident light incident onto the transflective film;
   a second display unit including a second liquid crystal display panel having a third substrate, a fourth substrate and a second liquid crystal layer between the third and fourth substrates; and
   a light supplying unit disposed between the first and second display units, the light supplying unit generating a first light to provide the first display unit with a first part of the first light and the second display unit with a second part of the first light, and the light supplying unit controlling an amount of the first and second parts of the first light to regulate a contrast ratio of a luminance between the first and second display units.

2. The liquid crystal display device of claim 1, wherein the first display unit further includes a first polarizing plate disposed on the first liquid crystal display panel and a second polarizing plate disposed between the first liquid crystal display panel and the transflective film, and the transflective film is integrally formed with the second polarizing plate.

3. The liquid crystal display device of claim 1, wherein the first display unit further includes a first polarizing plate disposed on the first liquid crystal display panel and a second polarizing plate disposed between the first liquid crystal display panel and the transflective film, and the transflective film is formed separate from the second polarizing plate to have a sheet shape.

4. The liquid crystal display device of claim 1, wherein the transflective film has an anisotropy characteristic having transmissivity and reflectivity varying depending on a polarized state and a direction of the incident light.

5. The liquid crystal display device of claim 4, wherein when the transflective film has a film thickness in z-direction and a film plane in x-y plane parallel with a surface of the transflective film, the first layer and the second layer respectively have three main refractive indexes of $n_x$, $n_y$ and $n_z$ that satisfy the following relationships:

$$n1_x = n1_z \neq n1_y;$$

$$n2_x = n2_y = n2_z;$$

$$n1_x \neq n2_x;$$

$$n1_y \neq n2_y; \text{ and}$$

$$|n1_x - n2_x| < |n1_y - n2_y|$$

in which n1x, n1y and n1z denote main refractive indexes of the first layer in x-direction, y-direction and z-direction, respectively, and n2x, n2y and n2z denote main refractive indexes of the second layer in x-direction, y-direction and z-direction, respectively.

6. The liquid crystal display device of claim 1, wherein the transflective film has isotropic transmission and reflection characteristics independent of a polarized state and a direction of the incident light.

7. The liquid crystal display device of claim 6, wherein when the transflective film has a film thickness in z-direction and a film plane in x-y plane parallel with a surface of the transflective film, the first layer and the second layer respectively have three main refractive indexes of $n_x$, $n_y$ and $n_z$ that satisfy the following relationships:

$$n1_x = n1_y = n1_z; \text{ and}$$

$$n2_x = n2_y = n2_z \neq n1_z.$$

in which n1x, n1y and n1z denote main refractive indexes of the first layer in x-direction, y-direction and z-direction, respectively, and n2x, n2y and n2z denote main refractive indexes of the second layer in x-direction, y-direction and z-direction, respectively.

8. The liquid crystal display device of claim 1, wherein a reflection path and a transmission path are provided in the first display unit, light traveling through the reflection path being incident onto a front face of the first liquid crystal display panel and reflected by the transflective film toward the first liquid crystal display panel to exit through the front face of the first liquid crystal display panel, and light traveling through the transmission path being incident onto a rear face of the first liquid crystal display panel from the light supplying unit after passing through the transflective film to exit through the first liquid crystal display panel.

9. The liquid crystal display device of claim 1, wherein the transflective film comprises a first transflective layer and a second transflective layer, the first transflective layer having transmissivity and reflectivity varying depending on a polarized state and a direction of the incident light, the second transflective layer having isotropic transmission and reflection characteristics independent of the polarized state and the direction of the incident light.

10. The liquid crystal display device of claim 1, wherein the first display unit further includes a light scattering layer.

11. The liquid crystal display device of claim 10, wherein the first display unit further includes a first polarizing plate disposed on the first liquid crystal display panel and a second polarizing plate disposed between the first liquid crystal display panel and the transflective film, and the light scattering layer is disposed between the first substrate and the second polarizing plate.

12. The liquid crystal display device of claim 10, wherein the first display unit further includes a first polarizing plate disposed on the first liquid crystal display panel and a second polarizing plate disposed between the first liquid crystal display panel and the transflective film, and the light scattering layer is disposed between the second substrate and the first polarizing plate.

13. The liquid crystal display device of claim 10, wherein the first display unit further includes a first polarizing plate disposed on the first liquid crystal display panel and a second polarizing plate disposed between the first liquid crystal display panel and the transflective film, and the light scattering layer is disposed between the second polarizing plate and the transflective film.

14. The liquid crystal display device of claim 1, wherein the transflective film comprises two anisotropic transflective layers each having a transmissivity and a reflectivity that vary according to a polarized state and a direction of the incident light.

15. The liquid crystal display device of claim 1, wherein the second display unit further includes:
a third polarizing plate disposed on a first surface of the second liquid crystal display panel; and
a fourth polarizing plate disposed on a second surface of the second liquid crystal display panel.

16. The liquid crystal display device of claim 1, wherein the light supplying unit comprises:
a light source for generating the first light;
a light guiding member for receiving the first light, providing the first display unit with the first part of the first light as a second light, and providing the second display unit with the second part of the first light as a third light; and
a luminance controlling member for reflecting a first part of the third light and transmitting a second part of the third light to control the contrast ratio of the luminance between the first and the second display units.

17. The liquid crystal display device of claim 16, wherein the light guiding member comprises:
a light incident face for receiving the first light;
a light reflective-transmissive face for reflecting the second light toward the first display unit and transmitting the third light toward the second display unit; and
a light exiting face, being opposite to the light reflective-transmissive face, for exiting the second light.

18. The liquid crystal display device of claim 17, wherein a light reflection pattern having a plurality of dots is formed on the light reflecive-transmissive face, and sizes of the dots are different such that a dot farther apart from the light incident face is larger than a dot closer to the light incident face in proportion to a distance between a corresponding dot and the light incident face.

19. The liquid crystal display device of claim 17, further comprising an optical sheet for changing an optical distribution of the second light so as to enhance an optical characteristic of the second light, the optical sheet being disposed between the light guiding member and the transflective film.

20. The liquid crystal display device of claim 16, wherein the luminance controlling member has a sheet shape.

21. The liquid crystal display device of claim 1, wherein the luminance measured at the first display unit is higher than the luminance measured at the second display unit.

22. The liquid crystal display device of claim 1, wherein a surface area of the first liquid crystal display panel has a size substantially equal to a surface area of the second liquid crystal display panel.

23. The liquid crystal display device of claim 1, wherein a surface area of the first liquid crystal display panel is larger than a surface area of the second liquid crystal display panel.

24. A liquid crystal display device comprising:
a first display unit including:
a first liquid crystal display panel having a first substrate, a second substrate and a first liquid crystal layer disposed between the first and second substrates, and
a first transflective film disposed under the first liquid crystal display panel, the first transflective film having a plurality of layers in which a first layer and a second layer each having a different refractivity index are alternately stacked, so that the first transflective film partially reflects and partially transmits a first incident light incident onto the first transflective film;
a second display unit including a second liquid crystal display panel having a third substrate, a fourth substrate and a second liquid crystal layer disposed between the third and fourth substrates; and
a light supplying unit disposed between the first and second display units, the light supplying unit dividing a first light, which is a first part of a light generated from an light source, into a third light and a fourth light to provide the first and second display units with the third and fourth light, respectively, and dividing a second light, which is a second part of the light generated from the light source, into a fifth light and a sixth light to provide the second and first display units with the fifth and sixth light, respectively, the light supplying unit controlling an amount of the third, fourth, fifth and sixth light to regulate a contrast ratio of a luminance between the first and second display units.

25. The liquid crystal display device of claim 24, wherein at least one switching device and a transparent pixel electrode electrically connected to the switching device are formed on the first substrate, and a transparent common electrode facing the transparent pixel electrode is formed on the second substrate.

26. The liquid crystal display device of claim 25, wherein the switching device is a thin film transistor.

27. The liquid crystal display device of claim 24, wherein the light supplying unit includes:
the light source for generating the light;
a first light guiding member for receiving the first light, for providing the first display unit with the third light, and for transmitting the fourth light toward the second display unit;
a second light guiding member for receiving the second light, for providing the second display unit with the fifth light, and for transmitting the sixth light toward the first display unit;
an luminance controlling member, disposed between the first and second display units, for reflecting a first part of the fourth light toward the first display unit, for transmitting a second part of the fourth light toward the second display unit, for transmitting a first part of the sixth light toward the first display unit, and for reflecting a second part of the sixth light toward the second display unit, to thereby control the contrast ratio of the luminance between the first and second display units.

28. The liquid crystal display device of claim 27, wherein the first light guiding member comprises:
a first incident face for receiving the first light;
a first light reflective-transmissive face for reflecting the third light toward the first display unit and for transmitting the fourth light toward the second display unit; and
a first light exiting face, being opposite to the light reflective-transmissive face, for exiting the third light, and
the second light guiding member comprises:
a second incident face for receiving the second light;
a second light reflective-transmissive face for reflecting the fifth light toward the second display unit and for transmitting the sixth light toward the first display unit; and
a second light exiting face, being opposite to the second light reflective-transmissive face, for exiting the fifth light.

29. The liquid crystal display device of claim 28, wherein a first light reflection pattern having a plurality of first dots is formed on the first light reflecive-transmissive face, a second light reflection pattern having a plurality of second dots is formed on the second light reflecive-transmissive face, wherein the first dots have different sizes such that the farther a first dot is apart from the first light incident face, the larger the first dot is in proportion to a distance between the first dot and the first light incident face, and the second dots have different sizes such that the farther a second dot is apart from the second light incident face, the larger the second dot is in proportion to a distance between the second dot and the second light incident face.

30. The liquid crystal display device of claim 29, wherein the first light guiding member has a surface area larger than that of the second light guiding member, the second dots have sizes with a higher ratio of a size change to a unit distance change than those of the first dots.

31. The liquid crystal display device of claim 24, wherein a surface area of the first liquid crystal display panel has a size substantially equal to that of the second liquid crystal display panel.

32. The liquid crystal display device of claim 24, wherein the first liquid crystal display panel has a surface area larger than that of the second liquid crystal display panel.

33. The liquid crystal display device of claim 24, wherein the second display unit further includes a second transflective film disposed between the second liquid crystal display panel and the light supplying unit, and the second transflective film has a plurality of layers in which a third layer and a fourth layer each having a different refractivity index are alternately stacked, so that the second transflective film partially reflects and partially transmits a second incident light incident onto the second transflective film.

* * * * *